United States Patent
Miller et al.

(10) Patent No.: US 11,126,436 B1
(45) Date of Patent: Sep. 21, 2021

(54) COMPILATION AND EXECUTION OF PARALLEL CODE FRAGMENTS

(71) Applicants: Matthew Miller, Irvine, CA (US); David Strong, Irvine, CA (US); Anthony Matyok, Irvine, CA (US)

(72) Inventors: Matthew Miller, Irvine, CA (US); David Strong, Irvine, CA (US); Anthony Matyok, Irvine, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 17/062,699

(22) Filed: Oct. 5, 2020

(51) Int. Cl.
*G06F 9/30* (2018.01)
*G06F 9/38* (2018.01)
*G06F 9/445* (2018.01)

(52) U.S. Cl.
CPC .......... *G06F 9/3812* (2013.01); *G06F 9/3017* (2013.01); *G06F 9/4451* (2013.01)

(58) Field of Classification Search
None
See application file for complete search history.

(56) References Cited

U.S. PATENT DOCUMENTS

| | | | |
|---|---|---|---|
| 8,938,725 B2 * | 1/2015 | Auerbach | G06F 8/456 717/140 |
| 8,959,496 B2 * | 2/2015 | Schulte | G06F 8/456 717/148 |
| 9,400,685 B1 * | 7/2016 | Ge | G06F 9/3828 |
| 9,977,725 B2 * | 5/2018 | White, Jr. | G06F 21/53 |
| 10,339,457 B2 * | 7/2019 | Ryckbosch | G06F 11/0754 |
| 10,768,915 B2 * | 9/2020 | Kashani | G06F 11/3612 |
| 10,860,939 B2 * | 12/2020 | Ryckbosch | G06F 11/3452 |
| 2017/0046157 A1 * | 2/2017 | Frazier | G06F 9/30145 |

* cited by examiner

*Primary Examiner* — Corey S Faherty

(57) ABSTRACT

Systems and methods for executing compiled code having parallel code fragments is provided. One method includes storing executable code having a plurality of parallel code fragments, each of the plurality of parallel code fragments representing alternative executable paths through a code stream. The method further includes determining a code level supported by a processor executable at a computing system, the processor executable supporting a hosted computing environment. The method also includes translating the executable code into machine-readable code executable by a processor of the computing system. Translating the executable code includes selecting a code fragment from among the plurality of parallel code fragments for execution based on the code level supported by the processor executable. The method includes executing the machine-readable code within the hosted computing environment.

21 Claims, 15 Drawing Sheets

COMPILATION AND EXECUTION OF PARALLEL CODE FRAGMENTS

BACKGROUND

Software packages are periodically upgraded by software developers, providing expanded feature sets, improved performance, or other advantages. This has the advantage to software users of consistently upgraded features. However, in some cases, those software users are required to be subscribers to the software to receive those updates and improved feature sets. Otherwise, those software users may not receive the upgraded/updated software. Traditionally, rights to such upgraded software would be managed by selectively distributing different versions of the same software to different customer entities, depending on the license/agreement in place with that customer entity.

In some instances, software providers supply the same or similar features to all customers, but differentiate among customers based on performance (often calculated in millions of instructions per second, or MIPS). In these instances, performance provided to the customer should remain constant (neither increase nor decrease) after software updates are released.

When performance improvements are implemented in code in such circumstances, it can be difficult to determine how to provide that code to customers. Also, code provided to one customer who has requested (and paid for) higher performance can be ported to another computing system for which higher performance was neither requested nor paid for, when performance of the software is not somehow platform-dependent. Accordingly, it can be difficult to control delivery of executable code having an appropriate performance level since it is desirable to only deliver executable code to a customer or computer (rather than source code) and have that code be executable at consistent, different performance levels or feature sets for different platforms.

SUMMARY

In general, the present disclosure relates to methods and systems for providing parallel code fragments in executable code. The parallel code fragments may be selected from during code translation in a hosted environment, thereby allowing that executable code to be configured for execution using an appropriate set of features and performance for the particular end entity receiving the executable code.

According to a first aspect, a computing system is disclosed that includes a processor and a memory. When instructions stored in the memory are executed by the processor, the instructions cause the computing system to perform: storing executable code having a plurality of parallel code fragments, each of the plurality of parallel code fragments representing alternative executable paths through a code stream; determining a code level supported by a host platform at a computing system, the host platform supporting a hosted computing environment; and translating the executable code into machine-readable code executable by a processor of the computing system. Translating the executable code includes selecting a code fragment from among the plurality of parallel code fragments for execution based on the code level supported by the host platform. The instructions cause the system to perform executing the machine-readable code within the hosted computing environment.

According to a second aspect, a method for executing compiled code having parallel code fragments is provided. One method includes storing executable code having a plurality of parallel code fragments, each of the plurality of parallel code fragments representing alternative executable paths through a code stream. The method further includes determining a code level supported by a host platform at a computing system, the host platform supporting a hosted computing environment. The method also includes translating the executable code into machine-readable code executable by a processor of the computing system. Translating the executable code includes selecting a code fragment from among the plurality of parallel code fragments for execution based on the code level supported by the host platform. The method includes executing the machine-readable code within the hosted computing environment.

According to a third aspect, a computer-readable storage device is disclosed, and has computer-executable instructions stored thereon which are executable by a processor of a computing system that is communicatively coupled to the computer-readable storage device. The instructions cause the computing system to: store executable code having a plurality of parallel code fragments, each of the plurality of parallel code fragments representing alternative executable paths through a code stream, the code stream written in a non-native instruction set architecture with respect to the computing system; determine a code level supported by a host platform at the computing system, the host platform supporting a hosted computing environment for execution of the executable code on a native instruction set architecture of the computing system; translate the executable code into machine-readable code executable by the processor via the native instruction set architecture, wherein translating the executable code includes selecting a code fragment from among the plurality of parallel code fragments for execution based on the code level supported by the host platform; and execute the machine-readable code within the hosted computing environment.

According to a fourth aspect, a computing system is disclosed that includes a computing device having a processor and a memory. The memory is communicatively coupled to the processor and stores instructions which, when executed by the processor, cause the computing device to compile executable code from source code, the executable code including at least one parallel code fragment set including a plurality of parallel code fragments, each of the plurality of parallel code fragments representing a common functional grouping of alternative executable paths through a code stream. Each of the plurality of code fragments is associated with a different code level and execution of the executable code includes selection of one of the plurality of parallel code fragments from the at least one parallel code fragment set based on a code level supported by a processor executable and a hosted operating system of a hosted computing environment at which the executable code is executed.

According to a fifth aspect, a computer-executable method includes storing executable code having a plurality of parallel code fragments, each of the plurality of parallel code fragments representing alternative executable paths through a code stream. The method further includes determining a code level supported by a processor executable at a computing system, the processor executable supporting a hosted computing environment. The method also includes translating the executable code into machine-readable code executable by a processor of the computing system, wherein translating the executable code includes selecting a code fragment from among the plurality of parallel code fragments for execution based on the code level supported by the processor executable and a hosted operating system of the hosted computing environment. The method includes executing the machine-readable code within the hosted computing environment.

According to a sixth aspect, a computing system includes a host computing device comprising a processor and a memory communicatively coupled to the processor. The memory stores instructions which, when executed by the processor, cause the computing system to perform: storing executable code including at least one parallel code fragment set including a plurality of parallel code fragments, each of the plurality of parallel code fragments representing a common functional grouping of alternative executable paths through a code stream; determining a code level supported by a processor executable and a hosted computing environment at the host computing device, the processor executable supporting the hosted computing environment; translating the executable code into machine-readable code executable by the processor, wherein translating the executable code includes selecting a code fragment from among the plurality of parallel code fragments for execution based on the code level supported by the processor executable and a hosted operating system of the hosted computing environment; and executing the machine-readable code within the hosted computing environment.

According to a still further aspect, a computing system includes a processor; and a memory communicatively coupled to the processor. The memory stores instructions which, when executed by the processor, cause the computing system to perform: storing executable code having at least one set of parallel code fragments, each of the plurality of parallel code fragments included in the set representing alternative executable paths through a code stream; determining at a processor executable at least one executable feature selected for use at execution of the executable code based on an identifier interpreted by a processor executable at the computing system, the processor executable supporting a hosted computing environment; translating the executable code into machine-readable code executable by the processor, wherein translating the executable code includes selecting a code fragment from among the set of parallel code fragments for execution that includes the feature based on the identifier and executing the machine-readable code within the hosted computing environment by the processor executable.

In a further aspect, a method of selecting, at execution time, features for execution that are included in parallel code fragments of executable code is disclosed. The method includes determining, at a processor executable that is executing on a host computing system, at least one executable feature selected based on an identifier interpreted by the processor executable in cooperation with a hosted computing environment. The method also includes translating executable code into machine-readable code, wherein translating the executable code includes selecting a code fragment from among a set of parallel code fragments for execution that includes the feature based on the identifier. The method further includes executing the machine-readable code within the hosted computing environment by the processor executable. The method includes, during execution of the machine-readable code, detecting, via the hosted computing environment and the processor executable, a change to the identifier indicating to discontinue use of the feature; and selecting an alternative code fragment from among the set of parallel code fragments that excludes the feature. The method includes replacing the code fragment with the alternative code fragment in the machine-readable code and continuing execution of the machine-readable code within the hosted computing environment. In a still further aspect, a method of selecting, at execution time, features for execution that are included in parallel code fragments of executable code, is disclosed. The method includes determining, at a processor executable that is executing on a host computing system, at least one executable feature selected based on an identifier interpreted by the processor executable in cooperation with a hosted computing environment. The method further includes translating executable code into machine-readable code, wherein translating the executable code includes selecting a code fragment from among a set of parallel code fragments for execution that excludes the feature based on the identifier, and executing the machine-readable code within the hosted computing environment by the processor executable. The method also includes, during execution of the machine-readable code, detecting, via the hosted computing environment and the processor executable, a change to the identifier indicating to initiate use of the feature; and selecting an alternative code fragment from among the set of parallel code fragments that includes the feature. The method includes replacing the code fragment with the alternative code fragment in the machine-readable code and continuing execution of the machine-readable code within the hosted computing environment, thereby enabling the feature during execution of the executable code.

DETAILED DESCRIPTION

Figure 1:
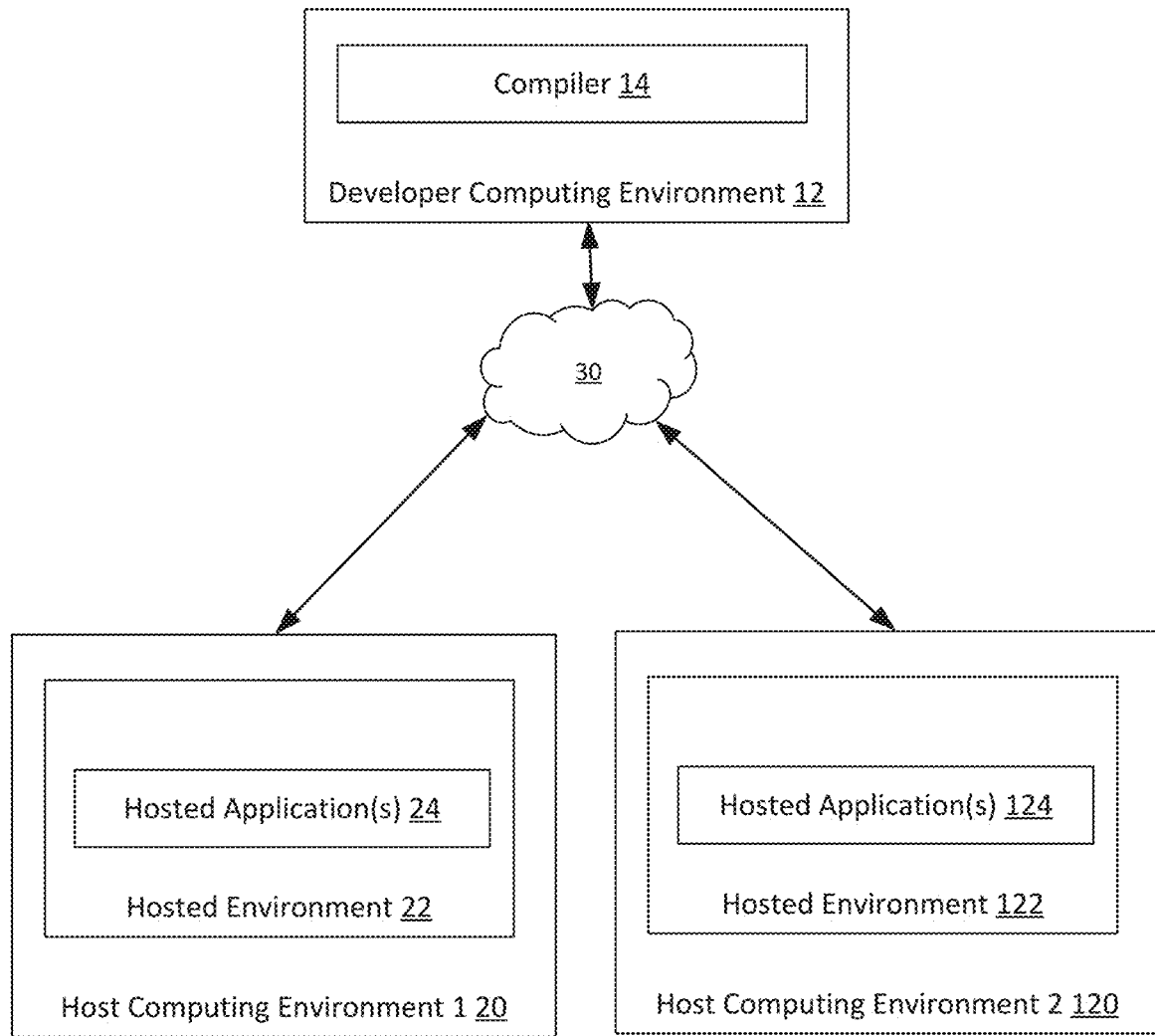
FIG. 1 illustrates an example environment in which aspects of the present disclosure may be implemented.

As briefly described above, embodiments of the present invention are directed to methods and systems for providing parallel code fragments in executable code. The parallel code fragments may be selected from during code translation in a hosted environment, thereby allowing that executable code to be configured for execution using an appropriate set of features and performance for the particular end entity receiving the executable code.

In particular embodiments, executable code may be distributed to end entities wishing to execute that code. The executable code can include a plurality of code fragments, which are translated prior to execution. During translation, the particular one of the plurality of parallel code fragments can be selected for translation, with the intention to be executed. Accordingly, the code ultimately translated and executed does not include extraneous instruction blocks or code segments, but is tailored for the specific platform and/or entity executing the code. In that way, the same code may be distributed to any of a number of end entities having different performance and/or execution capabilities, and the code is automatically adapted to that end entity.

One context in which use of such parallel code fragments may be utilized is in the context of a hosted environment. In some cases, a computing system, such as a commodity computing system having a determined instruction set architecture, may have a processor executable installed thereon. The processor executable may provide translation of instructions written in a non-native instruction set architecture prior to execution. By determining a version of the processor executable, and optionally an associated host environment (referred to herein collectively as a host platform), instructions may be translated from a hosted executable code having parallel code fragments into streamlined, executable code in the native instruction set architecture. A different host platform may translate the hosted executable code using different selections from among the parallel code fragments based on the capabilities of that different hosting platform. The different host platforms may enable different performance through differences in supported "code levels", or changes/extensions in an instruction set in later or more advanced versions. Such differences in execution may therefore be differences in performance (e.g., providing access to new instructions or instruction set architecture extensions, different algorithms for executing the same instructions or functions) or differences in operation (e.g., by adding or removing features based on the capabilities of a hosting platform, such as adding or removing debugging features). Accordingly, significant flexibility may be provided to the software provider to deliver a single executable code package to its customers, and the capabilities of the customer dictate the features ultimately included in the translated, machine-readable code available to that customer.

In further example embodiments, a compiler may be configurable to identify specific processes that are amenable to translation into a plurality of different executable code fragments. In such example embodiments, such a compiler may automatically include one or a plurality of such code fragments based on configuration of the compiler (e.g., based on an instruction to the compiler as to the number and type of code fragments to be included, a list of code segments that result in compilation into parallel code fragments, etc., for example based on a number or identification of specific code levels that are supported). This ensures backwards compatibility of the executable code base while allowing performance improvement benefits to be delivered as well to a selected subset of enabled devices.

Generally, the parallel code fragments described herein may be used to define different performance levels by allowing selection of a particular fragment having higher/lower performance to be executed based on a handshaking operation between a processor executable and a hosted operating system to determine the performance level at which code is allowed to execute. In further examples, described below, the parallel code fragments may be used to integrate selectably activatable/deactivatable features into executable code. The parallel code fragments contain knowledge of all possible code paths and select the appropriate code, based on features, at translation time. Selection of new features can trigger re-translation of sections of code and deployment of new executable code without the need to add an extra executable or modified source code. This may be particularly advantageous in circumstances where overhead associated with logging and/or debug states may not always be required, but may be advisable to be included for at least some limited time during execution.

Referring to FIG. 1, an example environment 10 in which aspects of the present disclosure may be implemented is shown. In the example shown, a computing environment 10 includes a developer computing environment 12, for example which may host a compiler 14. The developer computing environment 12 can compile and distribute executable programs to one or more endpoints, for example host computing environments 20, 120. In the example shown, the executable programs delivered to the endpoints may correspond to the same executable program.

In the example shown, host computing environments 20, 120 each provide a platform at which hosted environments 22, 122 may reside. In example embodiments, the host computing environments 20, 120 can each be a commodity computing system including one or more computing devices, such as the computing system described in conjunction with FIGS. 2-4. The host computing environments 20, 120 may, for example, execute utilizing a particular instruction set architecture and operate in system, such as a x86 or ARM-based instruction set architecture and a Windows-based operating system provided by Microsoft corporation of Redmond Wash.

The hosted computing environments 22, 122 may include, for example, a hosted environment that executes utilizing a different instruction set architecture as compared to the host system. For example, in some embodiments, the hosted computing environments 22, 122 may include a MCP-based computing environment provided by Unisys Corporation of Blue Bell, Pa. However, other instruction set architectures, or operating systems may be utilized as well.

In example embodiments, the host computing environments 20, 120 and/or hosted computing environments 22, 122 may have different rights and/or capabilities. For example, a first host computing environment 20 may be configured to provide a hosted environment 22 having a first capability set and a second host computing environment 120 may be configured to provide a hosted environment 122 having a second capability set that is different from the first capability set. For example, hosted environment 22 and hosted environment 122 may be configured to host code written for non-native instruction set architectures, but which may support different code versions from one another. The different code versions, or code levels, may provide different capabilities (e.g., by extending an instruction set architecture to improve performance using extended operators). Additionally, the different code versions may selectively incorporate additional features, such as particular debugging operations that may be inserted into the executable code in a particular execution mode.

Hosted applications 24, 124 execute within the hosted computing environments 22, 122, respectively. Hosted applications 24, 124 may be the same executable code or different executable code. However, because the users of the host computing environments 20, 120 and/or hosted computing environments 22, 122 may have different capabilities or rights, the hosted applications 24, 124 may execute differently despite being run from a same executable. This may be because, for example, the two host computing environments 20, 120 are different, because the hosted computing environments 22, 122 provide different capabilities, or because an accountholder managing those different environments has elected to enable specific features (e.g., via a service level agreement).

It is noted that users of the host computing environments 20, 120 and hosted environments 22, 122 may have agreed to a service level that provides a particular performance level (e.g., in instruction execution rates, etc.) While a user of the first host computing environment 20 may have agreed to a basic service level, a second user of environment 120 may have agreed to a maximum service level available. As discussed below, and in accordance with the present disclosure, executable code may be provided from the compiler 14 having parallel code fragments. Such executable code may be provided to a translation and/or interpretive system, as may be provided within hosted environments 22, 122.

As further discussed below, a process of distributing executable code for execution in hosted environments 22, 122 is provided in which parallel code fragments may be included within that executable code by a compiler. Prior to execution, a supported code level of the hosted environment may be assessed, and a final machine-executable set of code may be generated which selects the desired code fragment from among the parallel code fragments for execution. Accordingly, execution features may be varied between the various endpoint computing systems without requiring distribution of different code sets to those endpoints. Although discussed herein in the context of emulated or hosted software, it is recognized that the methods and systems described herein are not so limited. Rather, the methods and systems described herein represent a generalized approach for distributing a flexible set of executable code. Accordingly, FIGS. 2-4 below provide further details regarding a particular environment in which the parallel code fragments may be compiled and/or executed. FIGS. 5-15 then describe a general method for providing and using parallel code fragments within executable code, as well as specific methods that may be utilized within a hosted computing environment, which may execute using a different instruction set architecture as compared to the host on which the code is executed.

I. Example Hardware Environment

Figure 2:
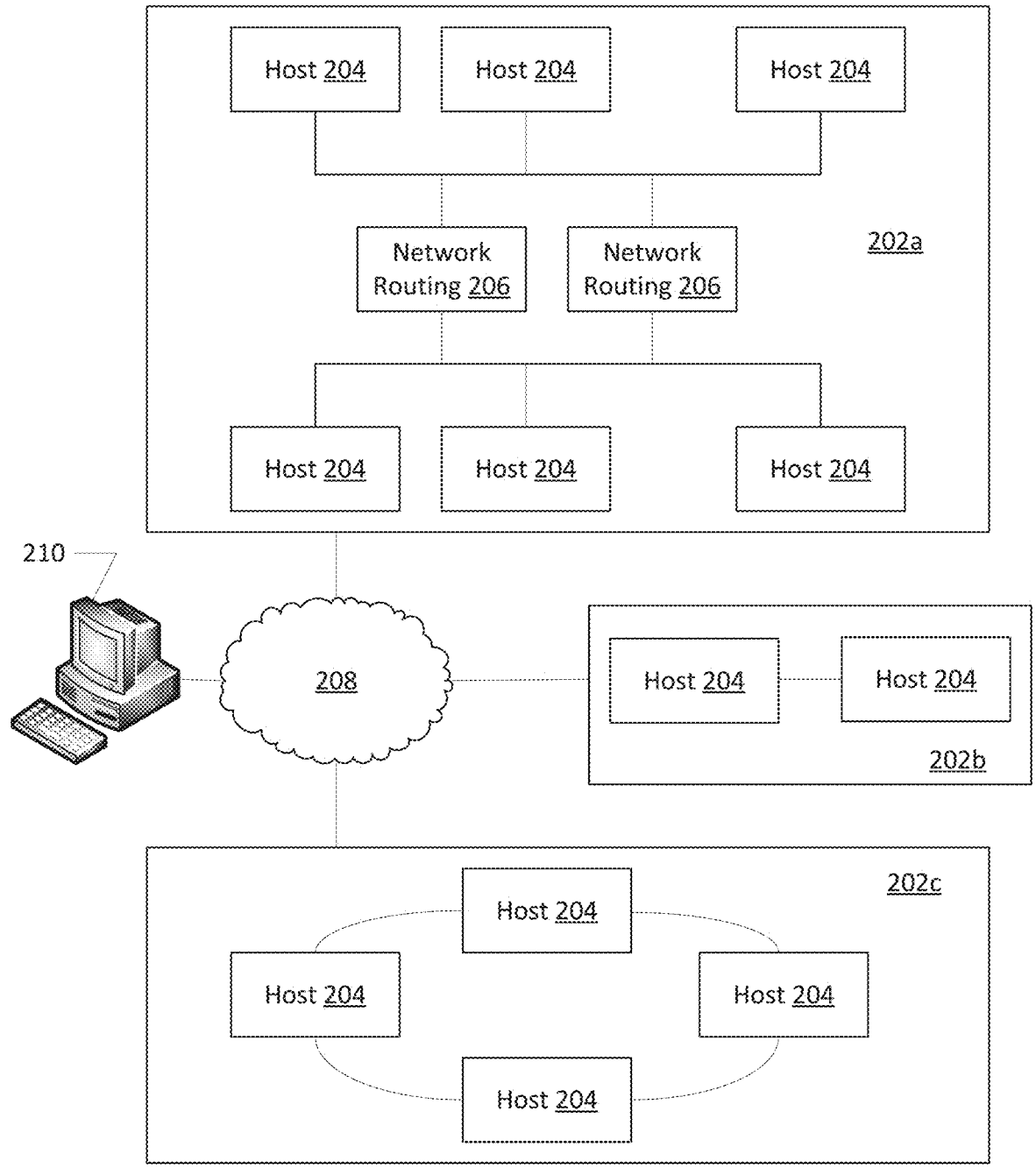
FIG. 2 illustrates a distributed multi-host system in which aspects of the present disclosure can be implemented.
Figure 3:
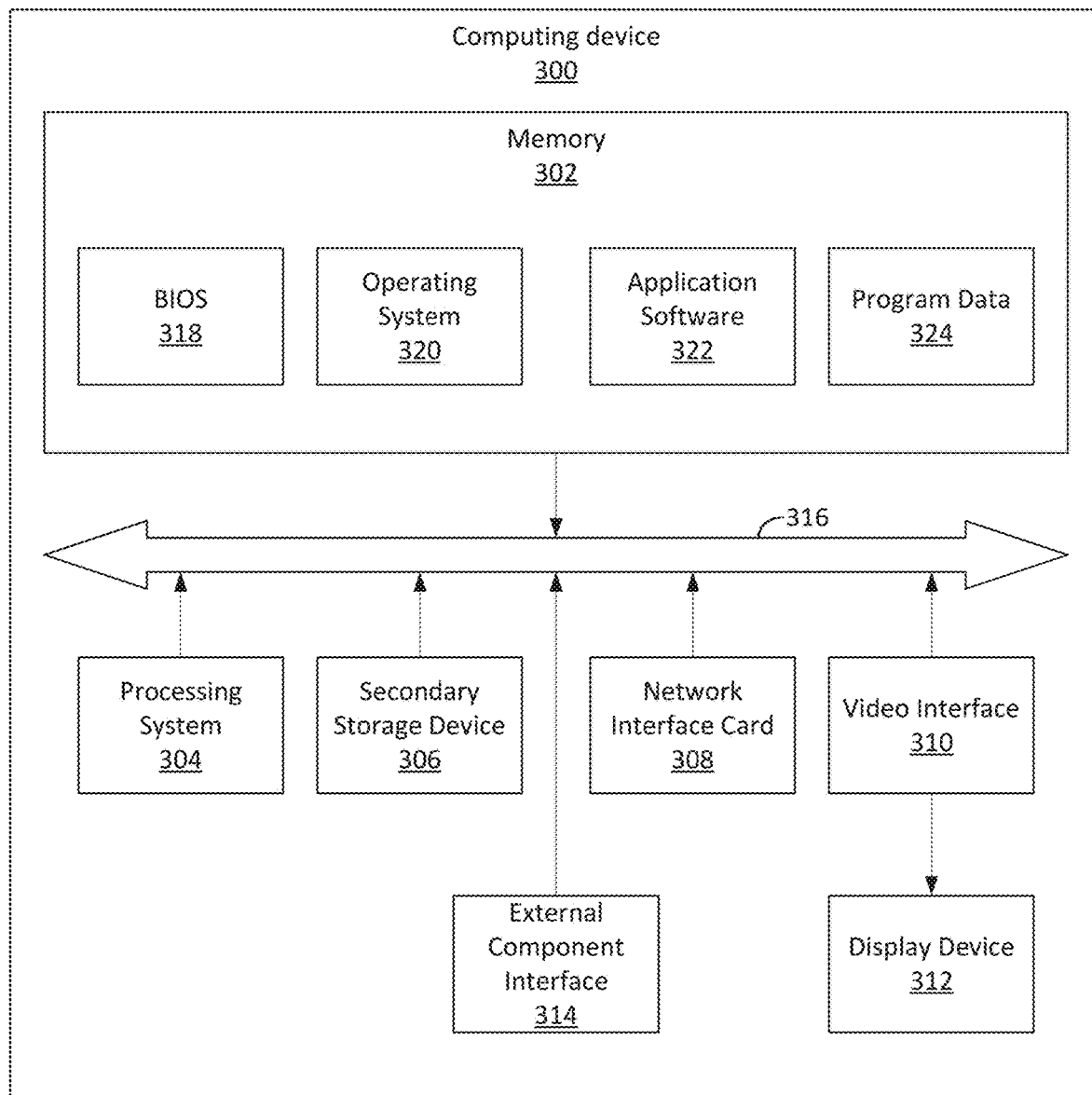
FIG. 3 is a schematic illustration of an example computing system in which aspects of the present disclosure can be implemented.
Figure 4:
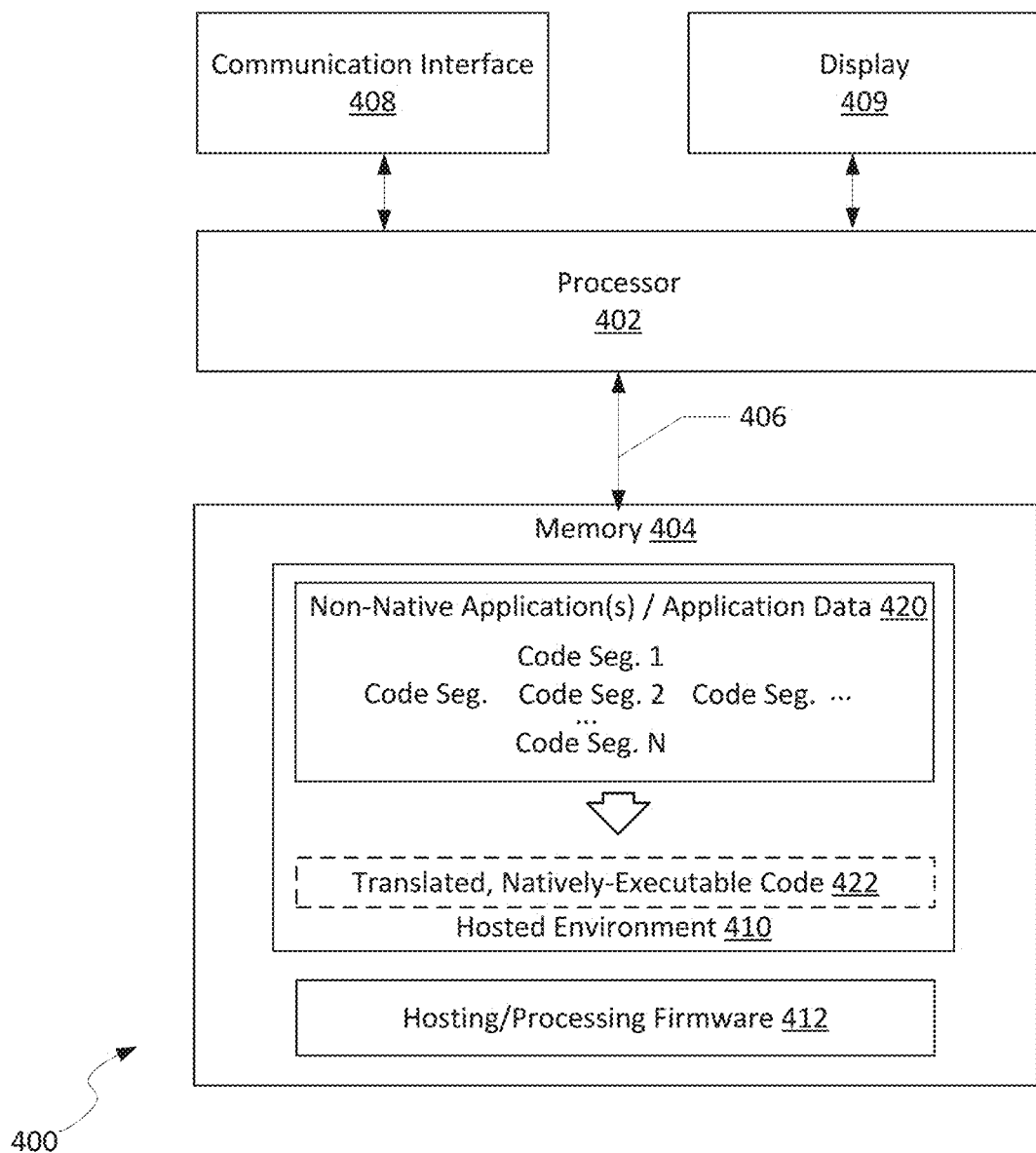
FIG. 4 is a schematic illustration of an example computing system useable as a host computing system for operation of a hosted computing environment useable in the context of the present disclosure.

Referring now to FIGS. 2-4, example hardware environments are disclosed in which aspects of the present disclosure may be implemented. The hardware environments disclosed may, for example, represent particular computing systems or computing environments useable within the overall context of the system described above in conjunction with FIG. 1.

Referring now to FIG. 2, a distributed multi-host system 200 is shown in which aspects of the present disclosure can be implemented. The system 200 represents a possible arrangement of computing systems or virtual computing systems useable to implement the environment 10 of FIG. 1. In the embodiment shown, the system 200 is distributed across one or more locations 202, shown as locations 202*a-c*. These can correspond to locations remote from each other, such as a data center owned or controlled by an organization, a third-party managed computing cluster used in a "cloud" computing arrangement, or other local or remote computing resources residing within a trusted grouping. In the embodiment shown, the locations 202*a-c* each include one or more host systems 204, or nodes. The host systems 204 represent host computing systems, and can take any of a number of forms. For example, the host systems 204 can be server computing systems having one or more processing cores and memory subsystems and are useable for large-scale computing tasks. In one example embodiment, a host system 204 can be as illustrated in FIG. 3.

As illustrated in FIG. 2, a location 202 within the system 200 can be organized in a variety of ways. In the embodiment shown, a first location 202*a* includes network routing equipment 206, which routes communication traffic among the various hosts 204, for example in a switched network configuration. Second location 202*b* illustrates a peer-to-peer arrangement of host systems. Third location 202*c* illustrates a ring arrangement in which messages and/or data can be passed among the host computing systems themselves, which provide the routing of messages. Other types of networked arrangements could be used as well.

In various embodiments, at each location 202, the host systems 204 are interconnected by a high-speed, high-bandwidth interconnect, thereby minimizing latency due to data transfers between host systems. In an example embodiment, the interconnect can be provided by an IP-based network; in alternative embodiments, other types of interconnect technologies, such as an Infiniband switched fabric communications link, Fibre Channel, PCI Express, Serial ATA, or other interconnect could be used as well.

Among the locations 202*a-c*, a variety of communication technologies can also be used to provide communicative connections of host systems 204 at different locations. For example, a packet-switched networking arrangement, such as via the Internet 208, could be used. Preferably, the interconnections among locations 202*a-c* are provided on a high-bandwidth connection, such as a fiber optic communication connection.

In the embodiment shown, the various host systems 204 at locations 202*a-c* can be accessed by a client computing system 210. The client computing system can be any of a variety of desktop or mobile computing systems, such as a desktop, laptop, tablet, smartphone, or other type of user computing system. In alternative embodiments, the client computing system 210 can correspond to a server not forming a cooperative part of the para-virtualization system described herein, but rather which accesses data hosted on such a system. It is of course noted that various virtualized partitions within a para-virtualization system could also host applications accessible to a user and correspond to client systems as well.

It is noted that, in various embodiments, different arrangements of host systems 204 within the overall system 200 can be used; for example, different host systems 204 may have different numbers or types of processing cores, and different capacity and type of memory and/or caching subsystems could be implemented in different ones of the host system 204. Furthermore, one or more different types of communicative interconnect technologies might be used in the different locations 202a-c, or within a particular location.

Referring now to FIG. 3, a schematic illustration of an example discrete computing system in which aspects of the present disclosure can be implemented. The computing device 300 can represent, for example, a native computing system operable as a host computing environment 20, 120, or developer computing environment 12. In particular, the computing device 300 represents the physical construct of an example computing system at which an endpoint or server could be established. In some embodiments, the computing device 300 implements virtualized or hosted systems, and executes one particular instruction set architecture while being used to execute non-native software and/or translate non-native code streams in an adaptive manner, for execution in accordance with the methods and systems described herein.

In the example of FIG. 3, the computing device 300 includes a memory 302, a processing system 304, a secondary storage device 306, a network interface card 308, a video interface 310, a display unit 312, an external component interface 314, and a communication medium 316. The memory 302 includes one or more computer storage media capable of storing data and/or instructions. In different embodiments, the memory 302 is implemented in different ways. For example, the memory 302 can be implemented using various types of computer storage media.

The processing system 304 includes one or more processing units. A processing unit is a physical device or article of manufacture comprising one or more integrated circuits that selectively execute software instructions. In various embodiments, the processing system 304 is implemented in various ways. For example, the processing system 304 can be implemented as one or more physical or logical processing cores. In another example, the processing system 304 can include one or more separate microprocessors. In yet another example embodiment, the processing system 304 can include an application-specific integrated circuit (ASIC) that provides specific functionality. In yet another example, the processing system 304 provides specific functionality by using an ASIC and by executing computer-executable instructions.

The secondary storage device 306 includes one or more computer storage media. The secondary storage device 306 stores data and software instructions not directly accessible by the processing system 304. In other words, the processing system 304 performs an I/O operation to retrieve data and/or software instructions from the secondary storage device 306. In various embodiments, the secondary storage device 306 includes various types of computer storage media. For example, the secondary storage device 306 can include one or more magnetic disks, magnetic tape drives, optical discs, solid state memory devices, and/or other types of computer storage media.

The network interface card 308 enables the computing device 300 to send data to and receive data from a communication network. In different embodiments, the network interface card 308 is implemented in different ways. For example, the network interface card 308 can be implemented as an Ethernet interface, a token-ring network interface, a fiber optic network interface, a wireless network interface (e.g., WiFi, WiMax, etc.), or another type of network interface.

The video interface 310 enables the computing device 300 to output video information to the display unit 312. The display unit 312 can be various types of devices for displaying video information, such as an LCD display panel, a plasma screen display panel, a touch-sensitive display panel, an LED screen, a cathode-ray tube display, or a projector. The video interface 310 can communicate with the display unit 312 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 314 enables the computing device 300 to communicate with external devices. For example, the external component interface 314 can be a USB interface, a FireWire interface, a serial port interface, a parallel port interface, a PS/2 interface, and/or another type of interface that enables the computing device 300 to communicate with external devices. In various embodiments, the external component interface 314 enables the computing device 300 to communicate with various external components, such as external storage devices, input devices, speakers, modems, media player docks, other computing devices, scanners, digital cameras, and fingerprint readers.

The communication medium 316 facilitates communication among the hardware components of the computing device 300. In the example of FIG. 3, the communications medium 316 facilitates communication among the memory 302, the processing system 304, the secondary storage device 306, the network interface card 308, the video interface 310, and the external component interface 314. The communications medium 316 can be implemented in various ways. For example, the communications medium 316 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 302 stores various types of data and/or software instructions. For instance, in the example of FIG. 3, the memory 302 stores firmware, such as a Basic Input/Output System (BIOS) 318 and an operating system 320. In the example shown, the BIOS 318 includes a set of computer-executable instructions that, when executed by the processing system 304, cause the computing device 3M to boot up. The operating system 320 includes a set of computer-executable instructions that, when executed by the processing system 304, cause the computing device 300 to provide an operating system that coordinates the activities and sharing of resources of the computing device 300. Furthermore, the memory 302 stores application software 322. The application software 322 includes computer-executable instructions, that when executed by the processing system 304, cause the computing device 300 to provide one or more applications. The memory 302 also stores program data 324. The program data 324 is data used by programs that execute on the computing device 3). Example program data and application software is described below in connection with FIGS. 4-5.

Although particular features are discussed herein as included within a computing device 300, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal.

By way of example, and not limitation, communication media may include wired media such as a wired network or direct-wired connection, and wireless media such as acoustic, radio frequency (RF), infrared, and other wireless media. Computer storage media does not include a carrier wave or other propagated or modulated data signal. In some embodiments, the computer storage media includes at least some tangible features; in many embodiments, the computer storage media includes entirely non-transitory components.

FIG. 4 is a schematic illustration of an example computing system useable within a computing environment, such as the host computing platforms 20, 120 described above in connection with FIG. 1.

In general, the computing system 400 includes a processor 402 communicatively connected to a memory 404 via a data bus 406. The processor 402 can be any of a variety of types of programmable circuits capable of executing computer-readable instructions to perform various tasks, such as mathematical and communication tasks, such as those described above in connection with FIG. 3.

The memory 404 can include any of a variety of memory devices, such as using various types of computer-readable or computer storage media, as also discussed above. In the embodiment shown, the memory 404 stores instructions which, when executed, provide a hosted environment 410, and hosting firmware 412, discussed in further detail below. The computing system 400 can also include a communication interface 408 configured to receive and transmit data, e.g., to provide access to a sharable resource such as a resource hosted by the hosted environment 410. Additionally, a display 409 can be used for viewing a local version of a user interface, e.g., to view executing tasks on the computing system 400 and/or within the hosted environment 410.

In example embodiments, the hosted environment 410 is executable from memory 404 via a processor 402 based on execution of hosting firmware 412. Generally, the hosting firmware 412 translates instructions stored in the hosted environment 410 for execution from an instruction set architecture of the hosted environment 410 to a native instruction set architecture of the host computing environment, i.e., the instruction set architecture of the processor 402. In a particular embodiment, the hosting firmware 412 translates instructions from a hosted MCP environment to a host Windows-based (e.g., x86-based) environment.

In example embodiments, the hosted environment 410 includes one or more applications 420. For example, the applications 420 may be written in any language, or compiled in an instruction set architecture, which is compatible with execution within the hosted environment 410. The applications 420 may be provided to the computing system 400 as executable code including a plurality of parallel code fragments. As discussed below, in some embodiments, the executable code can include a default code set, as well as a set of parallel code fragments useable in place of a portion of that default code set.

In the example shown, the applications 420 may be translated into natively executable code 422 which is executed via cooperation with the hosted environment 410 and the hosting firmware 412. In example embodiments the hosted environment 410 and hosting firmware 412 may translate the applications 420 into the natively executable code 422 via either a just in time compilation process or via interpretation (e.g., translation and execution concurrently on an instruction-by-instruction basis).

Although the system 400 reflects a particular configuration of computing resources, it is recognized that the present disclosure is not so limited. In particular, access to shamble resources may be provided from any of a variety of types of computing environments, rather than solely a hosted, non-native environment. The methods described below may provide secure access to such sharable resources in other types of environments II. Methods of Compiling and Executing Code Having Parallel Code Fragments in Executable Code Referring now to FIGS. 5-13, various embodiments are discussed for compiling and executing code having parallel code fragments in executable code. The embodiments discussed herein may utilize any of the systems described above with respect to FIGS. 1-4. Overall, the methods described herein provide a number of advantages over existing processes for distributing executable code to various end user devices, particularly in hosted environments.

In particular, source code may be compiled into executable code that includes parallel code fragments that vary based on a level of supported code that can be executed by an end user. The executable code can be non-native code (e.g., code written for execution according to a non-native instruction set architecture) and translated for native execution based on a detected, supported code level prior to execution, e.g., at the device on which the code will be executed. Accordingly, different performance or functional features can be provided to different end devices while distributing a single set of executable code, and without requiring the executable to assess or include, in its machine-executable format and at runtime, all of the alternative parallel code segments that are provided in the distributed executable code.

In example embodiments, the parallel code fragments may be included within executable code, but may be placed within unreachable code within a particular code segment. The parallel code fragments may be identified and accessed using metadata that is included within the default code stream for substitution into the code stream for improved/altered execution.

In example embodiments, parallel code fragments may be included within either a set of parallel code fragments (e.g., a collected set of alternative code fragments that may be used as substitutes for one another), or as a list of fragments that are available, stored in executable code at the end of a code stream (e.g., in unreachable code). As discussed herein, these are described as either a "set" of parallel code fragments, or a "list" of available code fragments that are to be included in the executable code. In the "set" implementation, each fragment represents a parallel implementation of the same functional grouping; a null fragment within the set indicates that other fragments within the set are optional for execution. In the "list" implementation, repeated instances of identical operators are included as targets for replacement, and metadata provides a most optimal substitute and a series listing the locations of targeted operators for substitution. Implementation of each solution is described in further detail below.

Figure 5:
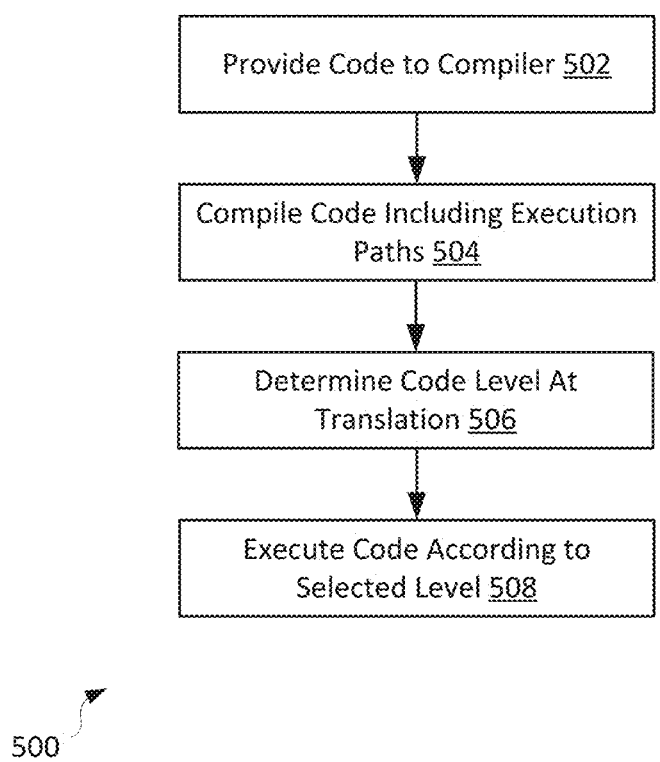
FIG. 5 is a flowchart of an example method of executing code derived from executable code having parallel code fragments, in accordance with aspects of the present disclosure.

Referring to FIG. 5, an example method 500 of executing code derived from executable code having parallel code fragments is shown. The method 500 may be performed using the environment discussed above in connection with FIGS. 1-4. In the example shown, the method 500 includes providing code for compilation to a compiler (step 502). This can include, for example, providing code to compiler 14 as seen in FIG. 1, for ultimate distribution of compiled code to one or more endpoints such as host computing systems 20, 120.

In the embodiment shown, the compiler may compile the code into the executable code (step 504). The executable code will generally include a plurality of parallel code fragments. The parallel code fragments may be identified using metadata within the compiled code that identifies the code fragment and a code level required for compatibility with that code fragment. The executable code will further include a default execution path that may be used in the event none of the parallel code fragments is associated with a compatible code level. In example embodiments, the compiled executable code may be the applications 420 as seen in FIG. 4, above, and as such may be written in a non-native instruction set relative to the host computing system on which the application will be executed. In still further embodiments, the executable code may include an operating system executable within the hosted computing environment 22, 122 (e.g., hosted by a processor executable).

In the executable code, parallel code fragments can be included in a number of different ways. In one example, a parallel code fragment set may be provided. Each parallel code fragment set can include individual sequences of zero or more operators that is a parallel implementation of the same functional grouping. In such cases, a set entry that has zero operators represents exclusion of an optional function (since a corresponding set entry having non-zero operators would be considered optional). In a further example, a parallel code fragment in series substitution (ISS) list can be used, for example for repeated instances of identical operators for potential replacement. Such lists, also referred to herein as a parallel code fragment issuance list or simply an issuance list, may be used for repeated potential replacement of the same operator instance in a given code stream. The ISS list metadata will define a most optimal substitute and a series of locations of targeted operators for substitution.

In the example shown, the method 500 may further include determining a code level at a time of translation of the executable code (step 506). Determining the code level may be performed after executable code is distributed to a particular endpoint, such as a host computing system 20, 120 seen in FIG. 1. A code level may refer to, for example, a particular defined instruction set in which later code levels support additional subsets of instructions that may be executed. Example code levels may include a default code level that incorporates typical arithmetic, branch, floating point, and other storage instructions, while a later code level may add extended operators such as parallel floating point operations that may be used in graphics subsystems, etc. A code level may be defined, at least in part, by compatibility between code with in that code level and code supported by hosting firmware and the hosted environment executed at the particular endpoint.

Accordingly, as reflected in the current application, an executable may include parallel code fragments that represent, for example, execution of a task using a default set of instructions as well as execution of the same task using an extended set of instructions from a more advanced code level. The extended set of instructions may provide additional performance benefits and as such may be selectively included within natively executable code.

Upon determination of the code level supported by the processor executable and/or hosted environment, the code may be translated and executed according to the selected code level (step 508). In example embodiments, the code that is executed has been translated to the native machine language of the host computing system. Additionally, because the code level has been resolved, only an appropriate code stream is required for inclusion in the native machine language. Therefore, the executable, native code need not include significant additional code that will not be executed, i.e., the unused code fragments. Accordingly, significant time with respect to translation of code fragments that will not be used during execution can be avoided. Additional overhead at the time of execution will therefore also be avoided.

Figure 6:
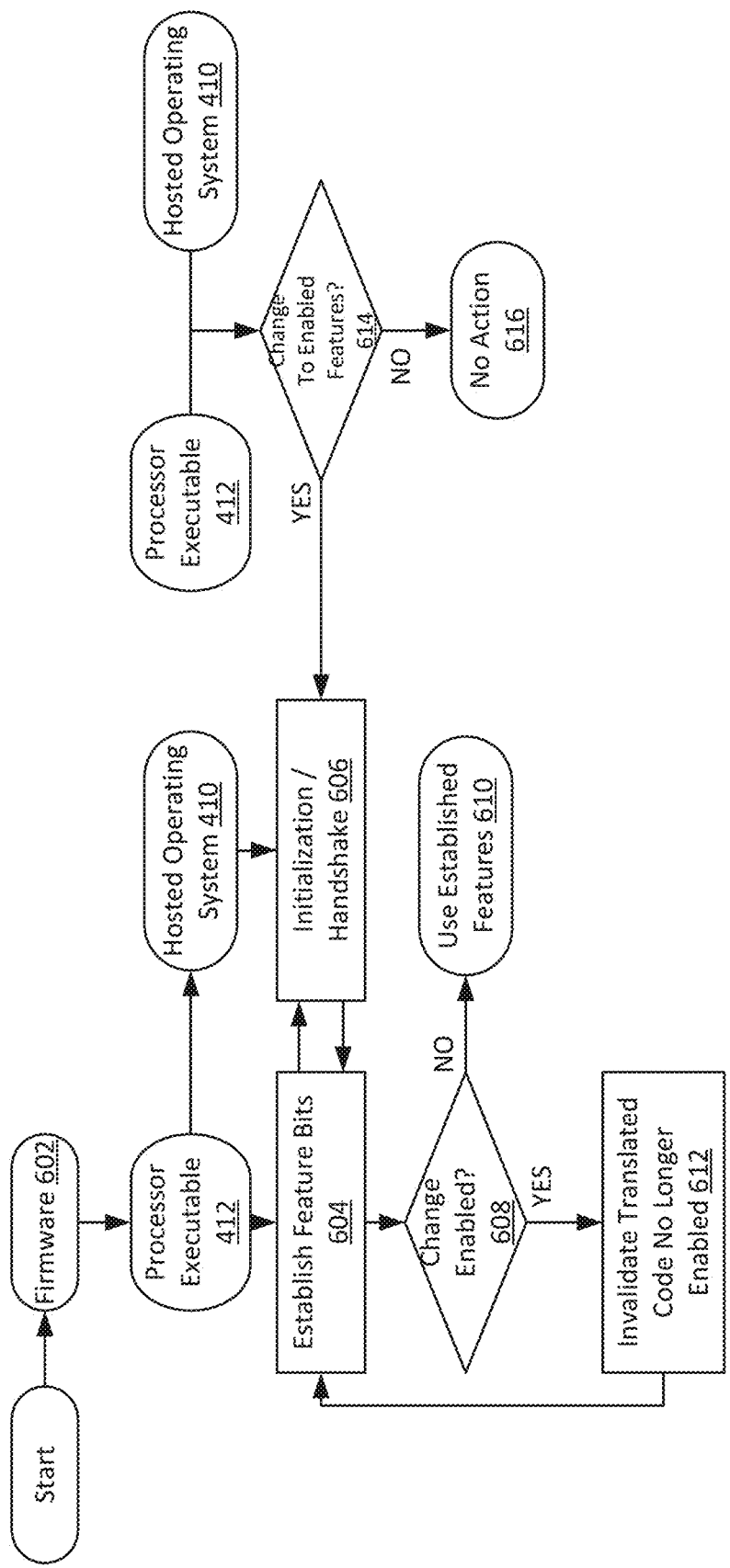
FIG. 6 is a flowchart of an example method of selecting parallel code fragments for translation, in an example embodiment.

FIG. 6 is a flowchart of an example method 600 of selecting parallel code fragments for translation, in an example embodiment. The example method 600 may be performed, for example, using the computing system 400 of FIG. 4, above, upon receipt and scheduled execution of the code including parallel code fragments. Upon initial initialization of the computing system, local firmware 602 (not seen in FIG. 4, but typically resident in computing systems) may initialize a set of hosting firmware, such as hosting firmware 412. The hosting firmware 412 may in turn host a hosted environment 410.

In the example shown, the hosting firmware 412 will perform a process 604 to establish feature bits included within the received executable code having the parallel code fragments. Additionally, the hosted environment 410 will trigger an initialization and handshaking process 606 with the hosting firmware 412. The handshaking process 606 may indicate to the hosting firmware 412 that an assessment of which features are enabled for a particular code level should be performed.

In the example shown, an assessment operation 608 determines whether any change in the enabled features provided by the hosting firmware 412 and hosted environment 410 has occurred. If no change to the enabled features has occurred, the existing established features are used (at operation 610). If a change has occurred, the previously translated code is invalidated (at process 612). A new set of feature bits is then established, via process 604.

During subsequent execution, the hosting firmware 412 and hosted environment 410 cooperate during execution of the code, and will assess the feature bits to determine whether a change to the enabled features has occurred (at operation 614). If no change has occurred, no action is required (at operation 616). If a change to the enabled features is detected, the handshaking process 606 may be triggered to cause feature bits to be reestablished be a process 604.

Accordingly, each time code is to be translated for execution (e.g., in the event of a change to settings or rights for a particular platform), changes in the enabled features on a particular platform can be assessed, with changes to the platform resulting in changes in what code is in fact executed from among the parallel code fragments. Notably, the specific features that are included and executed are determined without regard to or involvement of the compiler which simply includes all possible alternative parallel code fragments.

Figure 7:
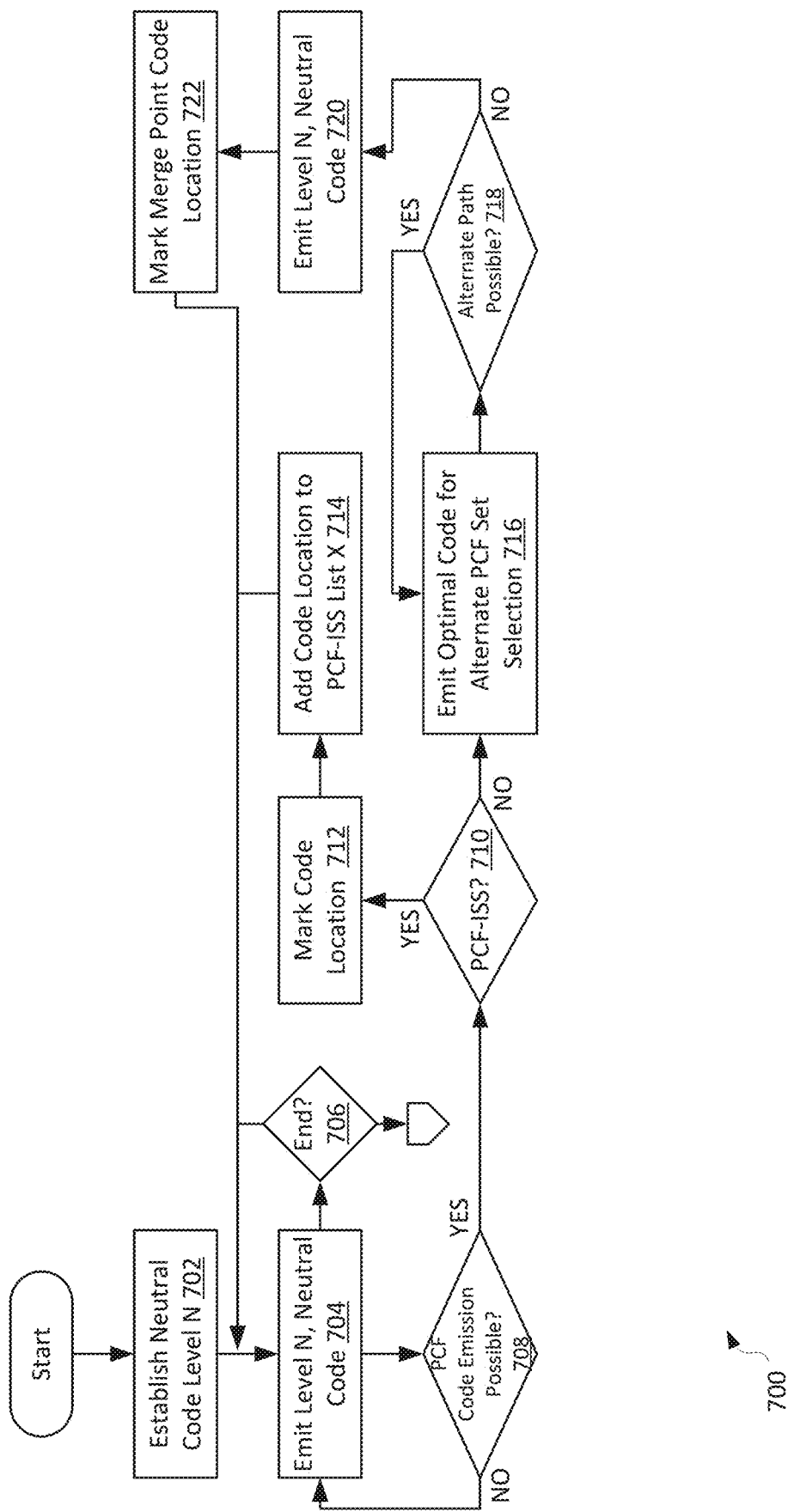
FIG. 7 is a flowchart of an example method of generating code including parallel code fragments in a compiler, according to an example embodiment.

Referring now to FIG. 7, a flowchart of an example method 700 of generating code including parallel code fragments in a compiler is shown. The method 700 may be performed to create executable code having parallel code fragments from source code.

In the example shown, the method 700 is initialized and establishes a neutral code level e.g., a default execution path (operation 702). The neutral code level has a step which will result in the compiler emitting code at that predetermined code level (operation 704) until the compiler determines that code emission is complete (e.g., via operation 706). Upon completion of code emission at the predetermined code level, a concluding process may be performed for emitting code from the compiler as described below in conjunction with FIG. 8. Until all such code is emitted, operational flow returns to operation 704 for purposes of continuing to emit code at that predetermined level.

Additionally, once neutral or level N code is emitted, an assessment is made as to whether parallel code fragment issuance is possible (at operation 708). If no parallel code fragment issuance is possible, operational flow returns to operation 704, to complete issuance of the code at the neutral code level. However, if parallel code fragment emission is possible, a parallel code fragment issuance list is assessed to determine whether a particular code fragment is included within that list (operation 710). If the parallel code fragment is included in such an issuance list, the code location is marked (at operation 712) and the code location is added to the parallel code fragment issuance list (operation 714) such that, at a time of translation and execution, the issuance list may be consulted to determine that the specific code fragment should be included at the marked code location when executable code is translated to native code. Operational flow then returns to operation 704 to determine if any further neutral code can be issued, followed by an assessment operation 706.

If the specific code segment is not included within an issuance list, then parallel code fragments that might be included from a "set" arrangement can be assessed. In particular, a set of optimal code for a lowest-level within the parallel code fragment set is issued (operation 716). The method 700 can iterate to continually assess whether alternate paths are possible in other code levels, and if so, to emit code at the next code level (operation 720). If a parallel code fragment at the next code level is emitted, a merge point code location is marked using metadata. Operation continues to assess whether further code is to be emitted and whether further parallel code fragments are available from such "sets".

Figure 8:
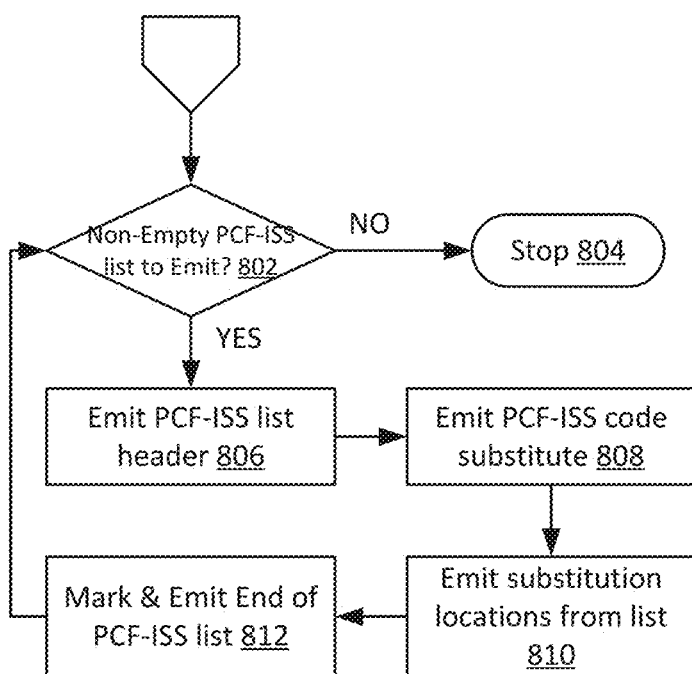
FIG. 8 is a further flowchart of the example method of generating code including parallel code fragments in a compiler, according to an example embodiment.

FIG. 8 is a further flowchart of an example method 800 of generating code including parallel code fragments in a compiler, according to an example embodiment. The method 800 may be used to conclude code emission from a compiler, for example as seen in the discussion above relating to FIG. 7.

The method 800 will generally be performed once all code emission of steps occur for a particular code set to be compiled. For example, parallel code fragments included in a parallel code fragments list may be already identified and marked as their locations in code via metadata. However, at this point, a code fragment associated with a particular parallel code fragments issuance list is not yet included in the compiled code. Rather, the parallel code fragments issuance list is now assessed (at operation 802) to determine whether any particular code fragments have been added to that list. If no parallel code fragments have been added to that list, no further code requires emission, and therefore operation flow may complete (at operation 804).

However, if the parallel code fragment issuance list is not empty, then a list header for an entry in the list is emitted (operation 806) including feature bits as may be required. The parallel code fragment issuance list code substitute is then issued (operation 808), and substitution locations are issued as well (operation 810). Once the code substitute and substitution locations are issued, operational flow returns to operation 802 to process a next entry in the parallel code fragments issuance list. Upon completion (i.e., no further entries exist), flow may terminate at operation 804.

Figure 9:
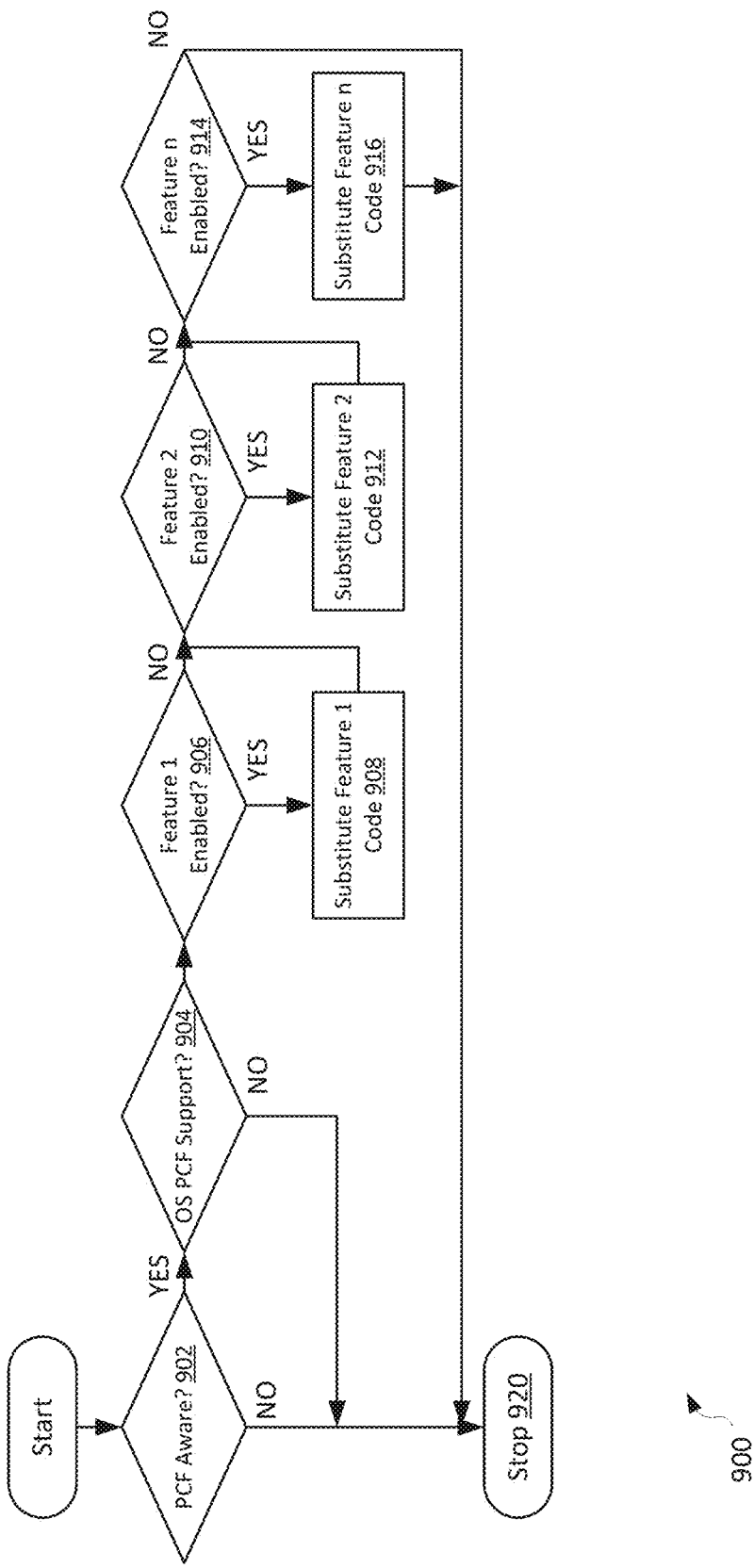
FIG. 9 is a flowchart of a method of pre-scanning compiled code for translation, in accordance with an example embodiment.

FIG. 9 is a flowchart of a method 90 of pre-scanning compiled code for translation, in accordance with an example embodiment. The method 900 may be performed cooperatively by the hosting firmware 412 and hosted environment 410, for example to perform just-in-time translation and/or interpretation of the executable code compiled in accordance with FIGS. 7-8.

In the example shown, the pre-scanning method 900 includes determining whether the hosted environment 410 and hosting firmware 412 are aware of the parallel code fragments included in the executable code (operation 902) and whether the hosted environment 410 supports processing of the parallel code fragments (operation 904). If either an executing host system is unaware of parallel code fragments, or if the hosting environment is incapable of supporting the parallel code fragments, the pre-scanning method 90 may terminate (operation 920). However, if both the host system is aware and the hosting environment is capable of supporting the parallel code fragments, an assessment is performed as to whether any particular feature from among a plurality of features are enabled in the parallel code fragments. For example, a first feature may be assessed to determine if that feature is enabled (operation 906); if the feature is enabled, that feature is substituted into the code for translation (operation 908). If the feature is not enabled, no substitution is performed and a next feature is assessed (operation 910).

Figure 10:
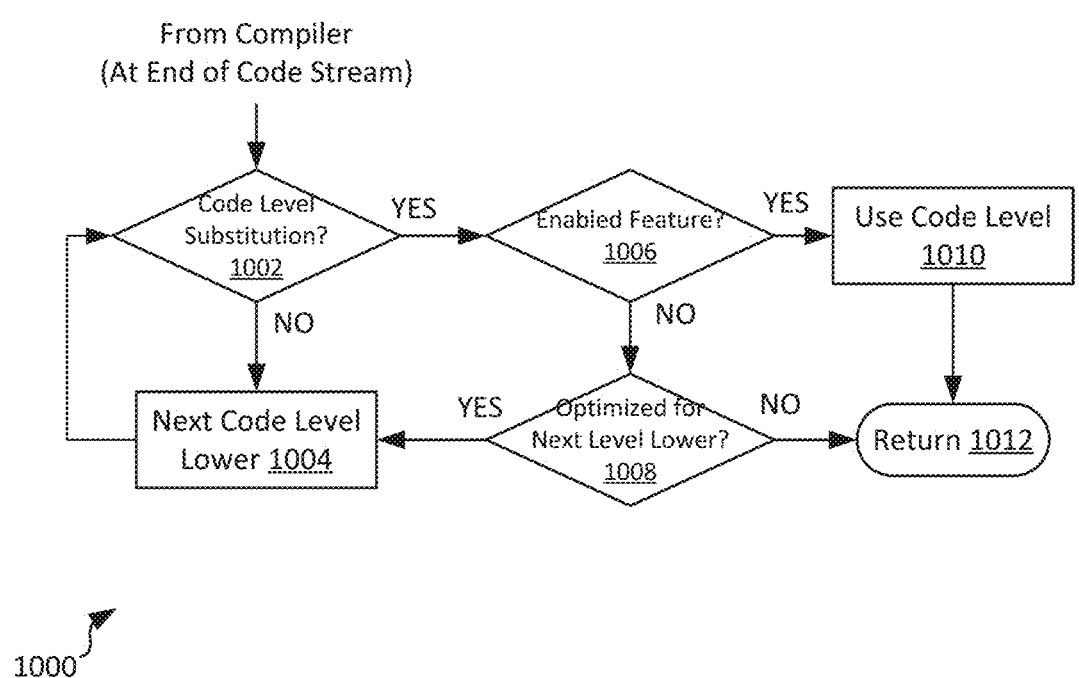
FIG. 10 is a flowchart of a method of substituting particular code fragments in translated code, in accordance with an example embodiment.

FIG. 10 is a flowchart of a method 100 of substituting particular code fragments in translated code, in accordance with an example embodiment. The method 1000 is particularly used in conjunction with a parallel code fragment issuance list, to identify a particular code level used for substitution of code from the parallel code fragment issuance list.

In general, the method 1000 allows for a substitution of parallel code fragments based on a hierarchy of code levels that may be supported. Generally, higher code levels may provide specializations, e.g., performance or additional integrity, not possible in lower code levels. Accordingly, starting at the highest code level available an assessment of whether a code level substitution is possible at that code level occurs (operation 1002). If a code level substitution is not available, a next code level lower is determined (operation 1004) and subsequently assessed to determine if substitution is possible (operation 1002) until all possible code levels are assessed which may be the subject of a parallel code fragment included in the parallel code fragment issuance list.

If substitution is determined to be possible, an enablement assessment is performed to determine whether the particular feature identified in the same parallel code fragment issuance list is enabled for that code level (operation 1006). If the particular feature is not supported, an assessment is performed to determine whether the feature is optimized for the next lower code level (at operation 1008). If the particular feature is supported at that code level, the current code level is used for feature substitution (operation 1010).

If there is available optimization for the next lower code level for the particular substitution, that next lower level is determined (operation 1004) and, assuming that level is available to be used, it will be (at operation 1010). If no optimizations for lower code levels are available, or once a substitution has been made at the highest-available code level, operation terminates (operation 1012).

Figure 11:
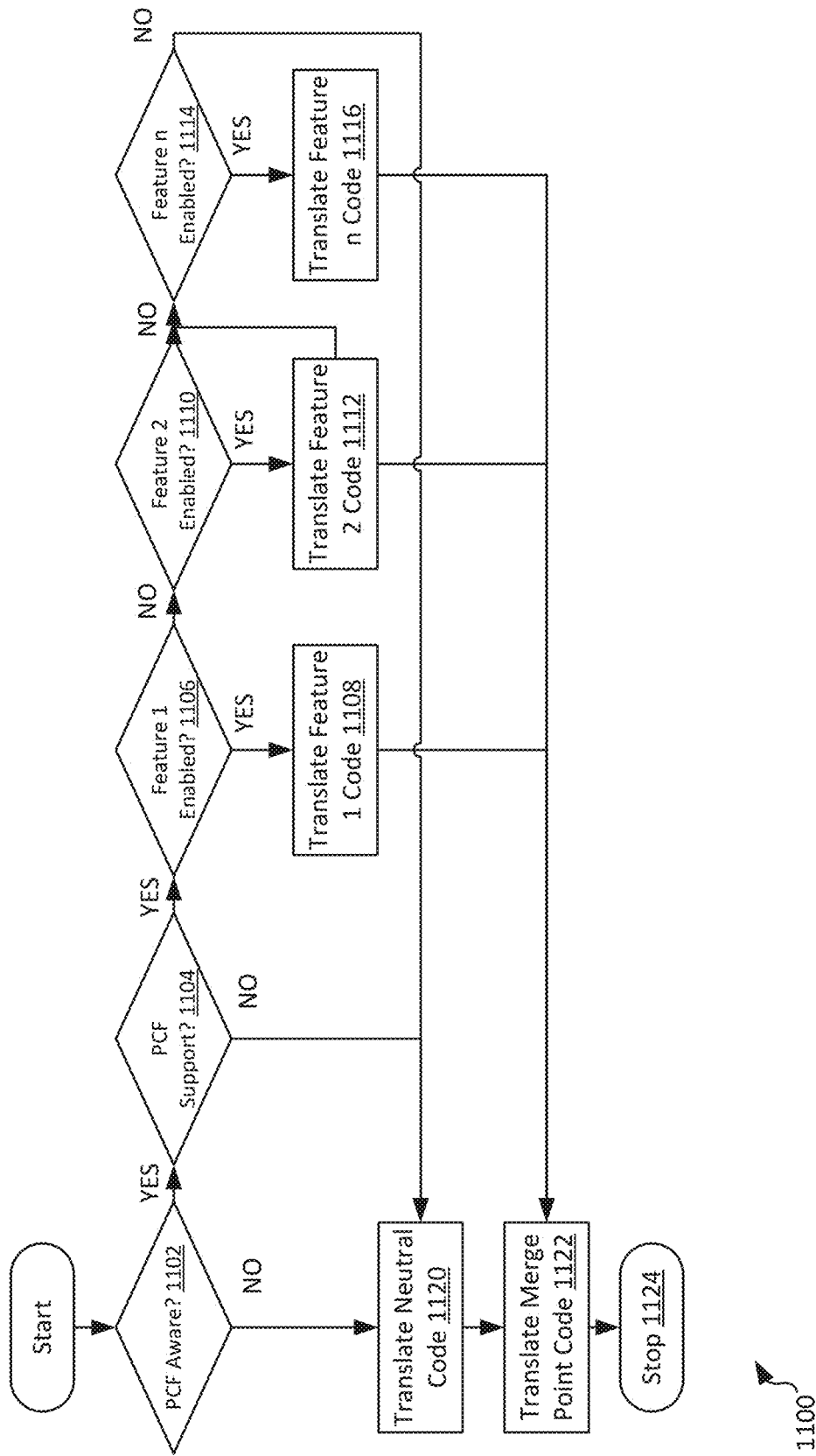
FIG. 11 is a flowchart of an example code translation process, in accordance with an example embodiment.

FIG. 11 is a flowchart of an example code translation process 10R), in accordance with an example embodiment. The example seen in process 1100 represents an overview of the code translation process in a hosted environment.

In the example shown, the process 1100 includes determining whether the hosted environment 410 and hosting firmware 412 are aware of the parallel code fragments included in the executable code (operation 1102) and whether the hosted environment 410 supports processing of the parallel code fragments (operation 1104). If the environment and firmware are not aware of the parallel code fragments, or if processing of the parallel code fragments is not supported, those systems will cooperatively translate a neutral, or default set of code for execution (operation 1120). Any merge point code may also be translated at that time (operation 1122). Because no parallel code fragments would be included, the process 1100 may then terminate (at operation 1124).

If the environment and firmware are aware of the parallel code fragments and such code fragments are supported, the compiled executable code including the parallel code fragments can be assessed to determine if particular features are enabled. For example, a first feature assessment operation may determine if a first feature is enabled (at operation 1106); if the feature is enabled, then it will be translated accordingly (at operation 1108) followed by a translation of the merge point code (operation 1122). Similarly, a second feature assessment operation may be executed as the first feature is not enabled (at operation 1110); if that second feature is enabled, its code fragment will be translated accordingly (at operation 1112) followed by translation of the merge point code (operation 1122). Such a process may be repeated for each of the parallel code fragments that may be executed as substitutes for one another, as illustrated by the nth feature assessment (operation 1114) followed by their translation of that feature code (operation 1116) and merge point code (operation 1122) or alternatively, translation of the neutral code (1120) followed by translation of merge point code. In other words, features are successively assessed and one of the selection of features may be identified and translated alongside merge point code or a default code path is selected for translation. The process 1100 may then terminate (at operation 1124).

Figure 12:
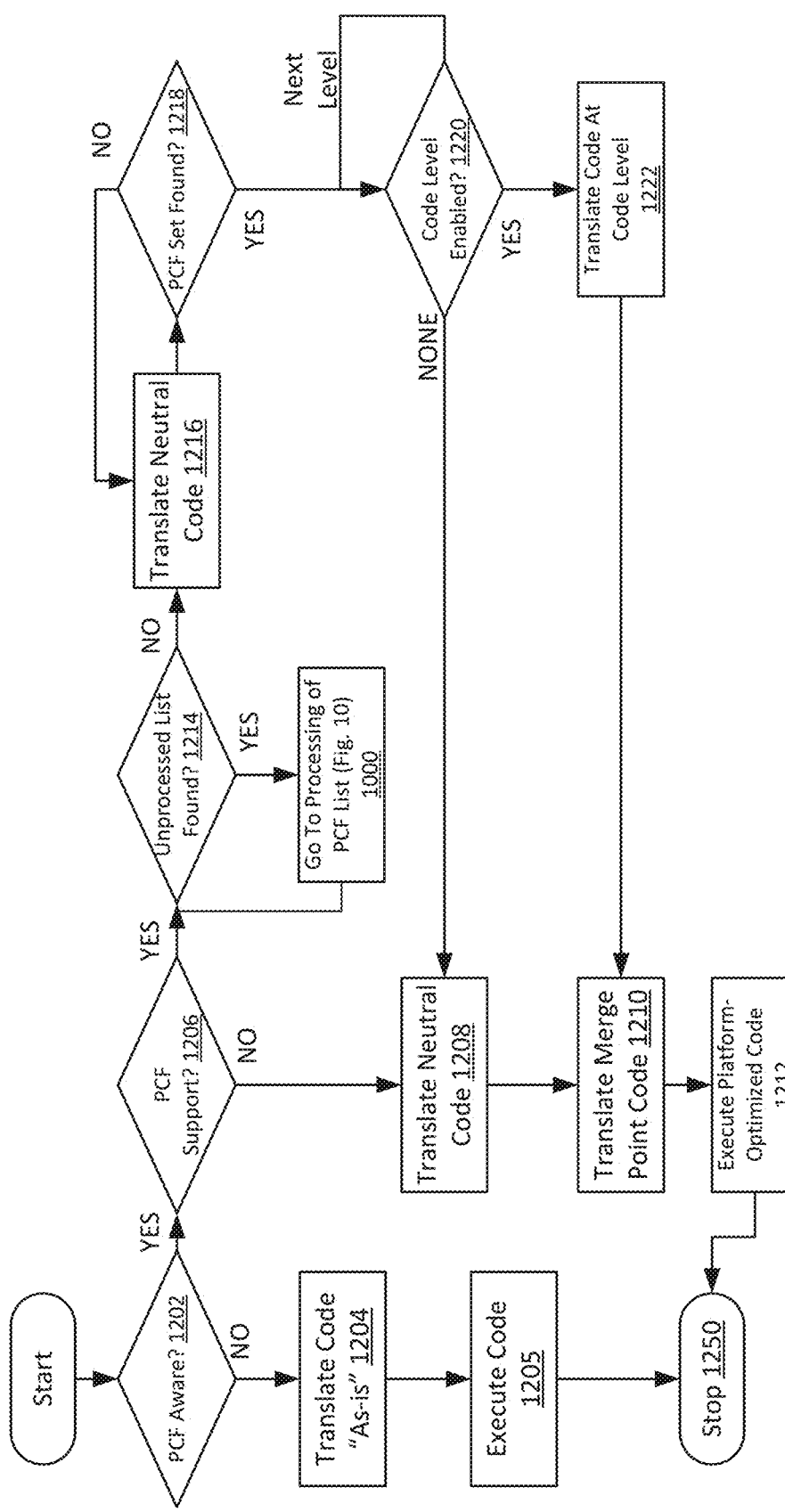
FIG. 12 is a flowchart of an example method of translating code that includes parallel code fragments, in accordance with example embodiments.

FIG. 12 is a flowchart of an example method 1200 of translating code that includes parallel code fragments, in accordance with example embodiments. The method 1200 may be performed by, for example, the hosting firmware 412 and hosted environment 410 once the executable code containing the parallel code fragments is provided, either for just-in-time translation to a native instruction set architecture or emulation.

In the example shown, the method 1200 includes initially determining whether the host computing system, including hosting firmware and hosted environment, is aware of the existence of parallel code fragments (operation 1202). If not aware, the input code may be translated "as is" (operation 1204) and the translated code is executed (operation 1205). Process flow terminates (at operation 1250).

However, if the host computing system is aware of the existence of parallel code fragments in the executable code, a further assessment is performed as to whether the hosted environment supports the use of parallel code fragments (operation 1206). If parallel code fragment support is not provided, only the neutral (default path) code requires translation (at operation 1208) and merge point code is translated as well, merging all portions of the translated code (operation 1210). Accordingly, once the neutral code is translated (since no parallel code fragments are supported), the platform optimized (in this case, default path) code can be executed natively on the host computing system (operation 1212).

If parallel code fragment support is provided, an assessment is performed to determine whether a parallel code fragment issuance list is found which has not been processed. If such a list exists, it should be processed in a manner similar to the processing described above in conjunction with FIG. 10 (e.g., via method 1000).

If no unprocessed parallel code fragment issuance list is found, or after all parallel code fragment issuance lists have been processed (as part of a translation pre-scan of non-native code instructions), a neutral (default path) code is translated (operation 1216), and a determination is made (e.g., based on presence of metadata within the executable code) indicating whether a parallel code fragment set is present (operation 1218). If a parallel code fragment set is not present, only the neutral code is translated for execution. However, if a parallel code fragment set is present, an assessment of whether a code level is enabled (operation 1220). If the code level is enabled, the code is translated by using the parallel code fragment at that particular code level (operation 1222). If the code level is not enabled, a next lower code level is selected and that code level is reassessed for enablement, with the next lower level code being the level at which translation occurs (if enabled). However, if all available code levels are assessed and not enabled, operational flow reverts to translation of a neutral code path (e.g., the default code) (at operation 1208). From there, merge point code may be translated and the overall platform optimize code executed (operations 1210, 1212, respectively).

Generally, the method 1200 relates to a portion of a translation process that includes any particular parallel code fragments encountered. The method 1200, or portions thereof, may be executed until completion of translation of all executable code necessary prior to execution.

Referring to FIGS. 8, 10, and 12, an example implementation for managing parallel code fragments issuance lists is provided below. In some cases, the code associated with such a list may be positioned at an end of a code stream (e.g., in otherwise unreachable code). In such a case, a set of emitted executable code may appear as follows:

Metadata for Operator Substitution
<Operator(s) Substitution>
Code Address List:
Code Address <first>
. . .
Code Address <last>
Metadata end In such an example, during compilation, the list and associated feature bits may be added by way of operation 806 of FIG. 8, and various substituted operators added by way of operation 808. Similarly, a list of code addresses may be inserted within the code stream via operation 810. The end point of the parallel code fragment issuance list can then be marked and emitted, e.g., via operation 812.

At a time of translation, and referring to FIG. 12, the list can be identified at operation 1214, at which point the processes of FIG. 10 may be executed. For example, a code level may be selected at operation 1010 for the particular code level. Upon completion (i.e., an end of the list is reached), flow may terminate at operation 1012, returning processing flow to FIG. 12 to consider any other unprocessed parallel code fragments issuance lists.

Also referring to FIG. 12 generally, an example of set of parallel code fragments that can be translated according to the method described herein is provided below. In general, in this executable code section, there are three code fragments at higher code levels (referred to as Versions 1, 2, and 3 in the code below) as well as default, common code for execution:

Bypass Fork for GENERICCODE
Metadata for Version 3 Code
<Version 3 Code for operation ABC>
Metadata for Version 2 Code
Version 2 Code for operation ABC>
Metadata for Version 1 Code
<Version 1 Code for operation ABC>
Metadata end
GENERICCODE:
<Generic Code for Operation ABC>
MERGE:
<Common Code>

In this example, the code is compatible with a generic code level GENERICCODE, but may be translated to a different code level using each of the code segments (marked as Metadata and Version X Code) depending on the compatibility of the hosted environment at the time of translation. In the above example, the parallel code fragment set can be determined (e.g., in operation 1218) based on the compatibility indication and inclusion Metadata Version marker. The respective translations at particular code levels (operation 1222) may correspond to the code included for operation "ABC" under each code level label above. The "GENERICCODE" label can indicate the default code for translation at operation 1208, and the "MERGE:" label, contains common code that is executed in accordance with all code levels.

III. Configurable Extension of Executable Feature Sets Using Parallel Code Fragments Referring now to FIGS. 13-15 generally, it is noted that in addition to management of performance of executable code at the time of execution, additional features may be selectably added/changed in the executable code during execution with little if any downtime and/or overhead. Rather, an alternative parallel code fragment is simply selected within the executable code for execution, e.g., based on feature selection as described above.

Figure 13:
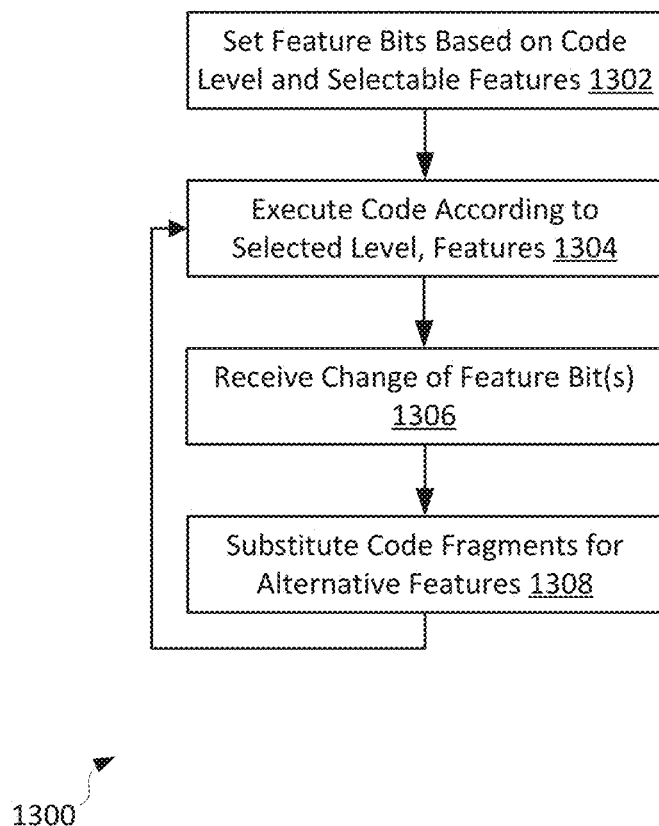
FIG. 13 is an example flowchart of a method of executing code to provide
Figure 14:
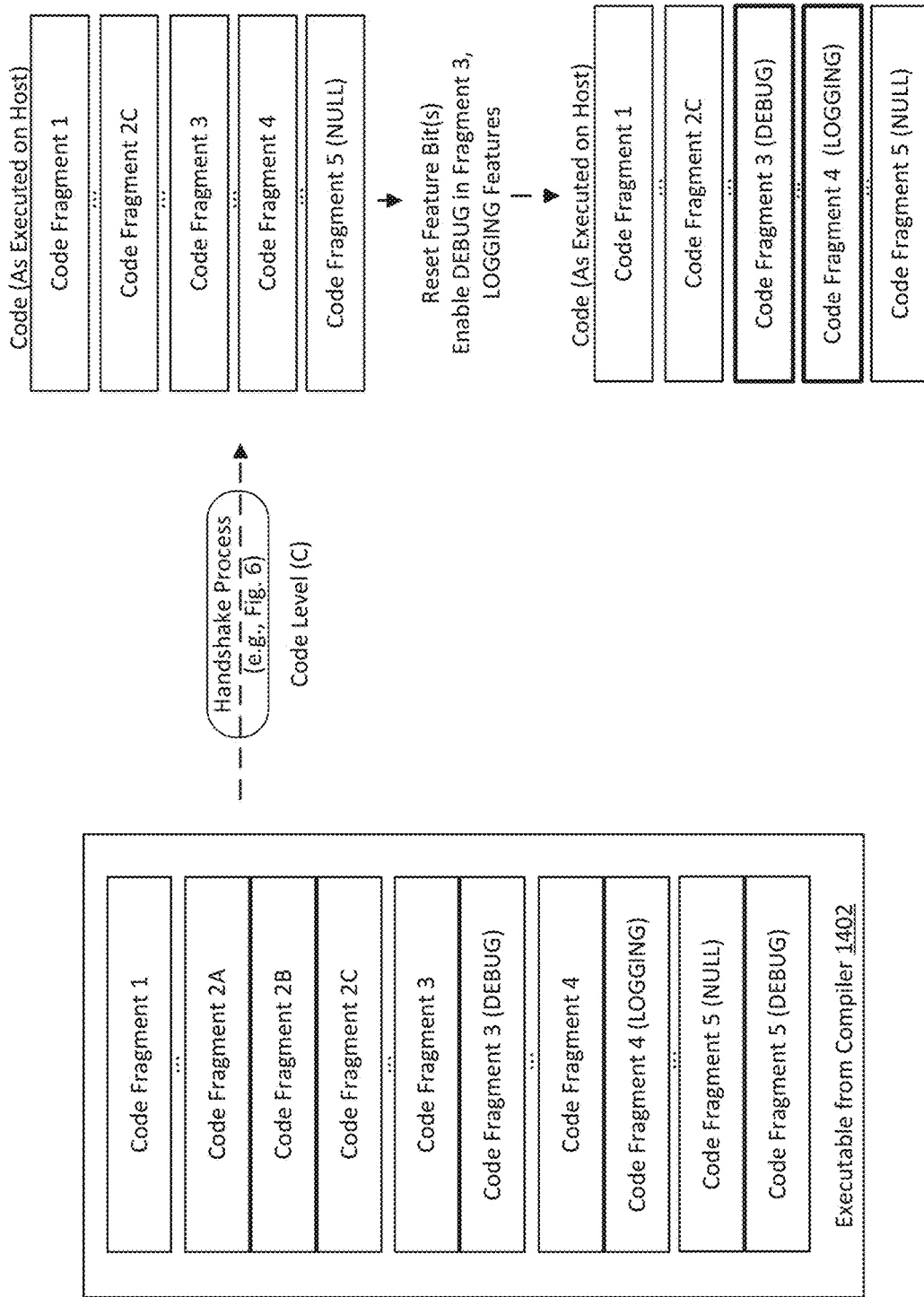
FIG. 14 is an example logical diagram of executable code illustrating implementation of multiple parallel code fragments, according to an example embodiment.

FIG. 13 illustrates a general process 1300 by which differing feature sets may be enabled using parallel code fragments, according to an example embodiment. In this example, executable code has been compiled including, for example, a code fragment that includes a particular feature (e.g., a debug feature, a logging feature, a feature required for audit or other management functions) and an alternative/parallel code fragment that excludes the feature that is selectively enabled. An example of such a configuration is seen in FIG. 14, and described below.

In some instances, a set of feature bits may be used to define a code level and one or more selectable features to be enabled (step 1302). In example embodiments, each of the selectable features may correspond to a particular feature as well as a particular location within the code at which the feature is enabled. In alternative embodiments, other manners of identifying features may be used for identification of a code level and selectable features.

In the example shown, the process 1300 includes executing the code in accordance with the selected level and features (step 1304). This generally corresponds to selection of one or more particular parallel code fragments identified based on a code level supported by the hosting computing system, hosting executable, and associated hosted operating system. This can correspond to, for example, the establishment of feature bits and initialization/handshaking of operations 604, 606 of FIG. 6, above.

As described further below, during execution, a change of feature bits may be received (operation 1306). Upon receipt of the changed feature bits, the processor executable and hosted operating system may renegotiate to change the enabled features utilized from the executable code. For example, a change to enabled features many cause re-initialization of the selected parallel code fragments. The updated executable code may then be utilized, executing only those portions of code including the parallel code fragments used to enable the particular code level and the selected features. As illustrated in FIG. 13, this may include substituting code fragments for alternative code fragments that include the relevant features that were selected using the feature bits (step 1308). Notably, that substitution may occur on the fly, during execution of the code, since the hosting executable detects the change in features and negotiates to only execute that code which enables the selected features.

As compared to the general process described above in conjunction with FIGS. 5-12 in which a particular code level support (set by feature bits) allows for selection of one of the parallel code fragments, in this instance, the parallel code fragments that are used may be specific to a particular added feature throughout the executable code or a portion thereof. Accordingly, different specific feature bits may be used to enable different features, or to enable the same feature within different sections of the executable code.

FIG. 14 illustrates how a particular collection of executable code that includes parallel code fragments may be executed by a hosted operating system and processor executable to select different ones of parallel code fragments at a time of execution.

The arrangement 1400 of FIG. 14 includes executable code 1402 that includes a plurality of different parallel code fragments. In the example shown, there is a first set of parallel code fragments (shown as Code Fragments 2A-2C) that represent alternative versions of the same functional code, called as alternatives to one another based on a supported code level as determined by a processor executable in negotiation with a hosted operating system that assists with execution of the executable code.

There is also a second set of parallel code fragments, "Code Fragment 3" and "Code Fragment 3 (DEBUG)" which may perform the same general functions, both for which the "(DEBUG)" version executes by also including one or more breakpoints or diagnostic traces therein. In this instance, the two code fragments may execute the same underlying function, but the "(DEBUG)" version may introduce overhead that is typically experienced during debug. Accordingly, it is desirable to only execute the "(DEBUG)" version during a period of time where debugging is required. It is also desirable to be able to, during execution, selectively choose whether to execute the "(DEBUG)" version or the non-"(DEBUG)" version of that code fragment to either perform debugging operations or avoid that overhead on the fly. For example, if an anomaly is experienced during execution of the code, installation of a separate debug executable may not detect the same anomaly since the condition may not readily be recreated. However, by switching modes and selecting different parallel code fragments, the execution condition can be preserved while the "(DEBUG)" version is selected mid-execution to root cause such an anomaly.

Additionally, a third set of parallel code fragments, "Code Fragment 4" and "Code Fragment 4 (LOGGING)", represent a different possible feature that may be introduced at or during execution time of the executable code by adjustment of feature bits. In this instance, a logging set of code may generate a log of events that occur in the code, e.g., to provide an audit trail. Similar to the debug mode above, such logging may be desirable from only a portion of the executable code, or for only a portion of the overall runtime of the executable code.

Finally, in the example shown, a fourth set of parallel code fragments, "Code Fragment 5 (NULL)" and "Code Fragment 5 (DEBUG)" represent alternatively executing fragments that allow for selective introduction of a debug code fragment without requiring that debug code to be integrated into other functional code (e.g., as is reflected in Code Fragment 3. In this instance, the debug functionality may be selectively implemented in exchange, not with a code fragment that implements analogous functionality, but with a null code fragment. Accordingly, selection of the null code fragment acts as removing the overhead of the debug functionality without adding some substitute functionality. In this way, Code Fragment 5 (and parallel alternatives) represents an alternative implementation of debug functionality to the functionality in Code Fragment 3 (and alternatives).

In operation, a set of feature bits are used to select not just a code level, but which code fragments from the other code fragment sets are selected for execution using the parallel code fragment sets functionality described above. This can be accomplished, for example, based on the methodology described above in conjunction with FIG. 6. Once an initial set of feature bits are selected, the executable code may be executed, causing selection of particular ones of the parallel code fragments for execution. In the example shown, one of the parallel code fragments from each set of parallel code fragments is selected for execution. Specifically, a code level "C" is selected by the feature bits, but no additional feature sets are included. Accordingly, code fragments 1, 2C, 3, 4, and 5 are selected for execution.

At some point prior to, or during, execution, one or more feature bits may be adjusted. In the example shown, the debug feature in Code Fragment 3 is selected, and the logging feature of Code Fragment 4 is also selected. Accordingly, during subsequent execution of the executable code, the code level ("C") remains unchanged, and the additional region of debugging features in Code Fragment 5 is not selected. Accordingly, the processor executable and hosted operating system will determine that feature bits have changed, and will act to substitute the appropriate parallel code fragment into execution in place of the originally-selected code fragment, at the time of execution. In some instances where the processor executable translates the executable code for subsequent execution, a just-in-time retranslation may be performed to ensure use of the newly-designated parallel code fragment during execution. In alternative embodiments, the processor executable and hosted operating system may simply facilitate switching of code segments to the new code segment designated by the feature bits for execution.

Additional details regarding negotiation of which parallel code fragment is selected at execution time are provided below in conjunction with an example selection of a debug feature for inclusion using parallel code fragments. It is understood that similar processes may be used for various features at execution time, being associated with different feature bits. Feature bits may be changed at execution time to enable/disable various features in accordance with the processes described herein.

Additionally, although debug and audit/logging functionality are illustrated as possible parallel code fragments, other types of parallel code fragments may be used as well. For example, added functionality for audit or compliance with applicable regulations. In such instances, parallel, selectable audit features may include a Sarbanes-Oxley audit feature, a Health Insurance Portability and Accountability Act (HIPAA) audit feature, or a General Data Protection Regulation (GDPR) audit feature, or similar regulations. In some instances, a logging function may utilize parallel code fragments (which are parallel with each other) that are selectable with feature bits to define a specific output format in compliance with such reporting regulations.

Still further, although in FIG. 14 individual parallel code segments are implemented, it is recognized that in some implementations, particular features may be implemented by including operations at multiple locations within executable code. For example, a logging or debug operation may be required to be included throughout various locations in executable code as events take place. Accordingly, while only individual parallel code fragment sets are shown, in typical implementations, inclusion of a feature may correspond to selection of a particular one of a plurality of parallel code fragments within a number of sets of parallel code fragments throughout the executable code. Depiction of a single set of parallel code fragments for each feature is not intended as limiting but rather for brevity and clarity of illustration.

Figure 15:
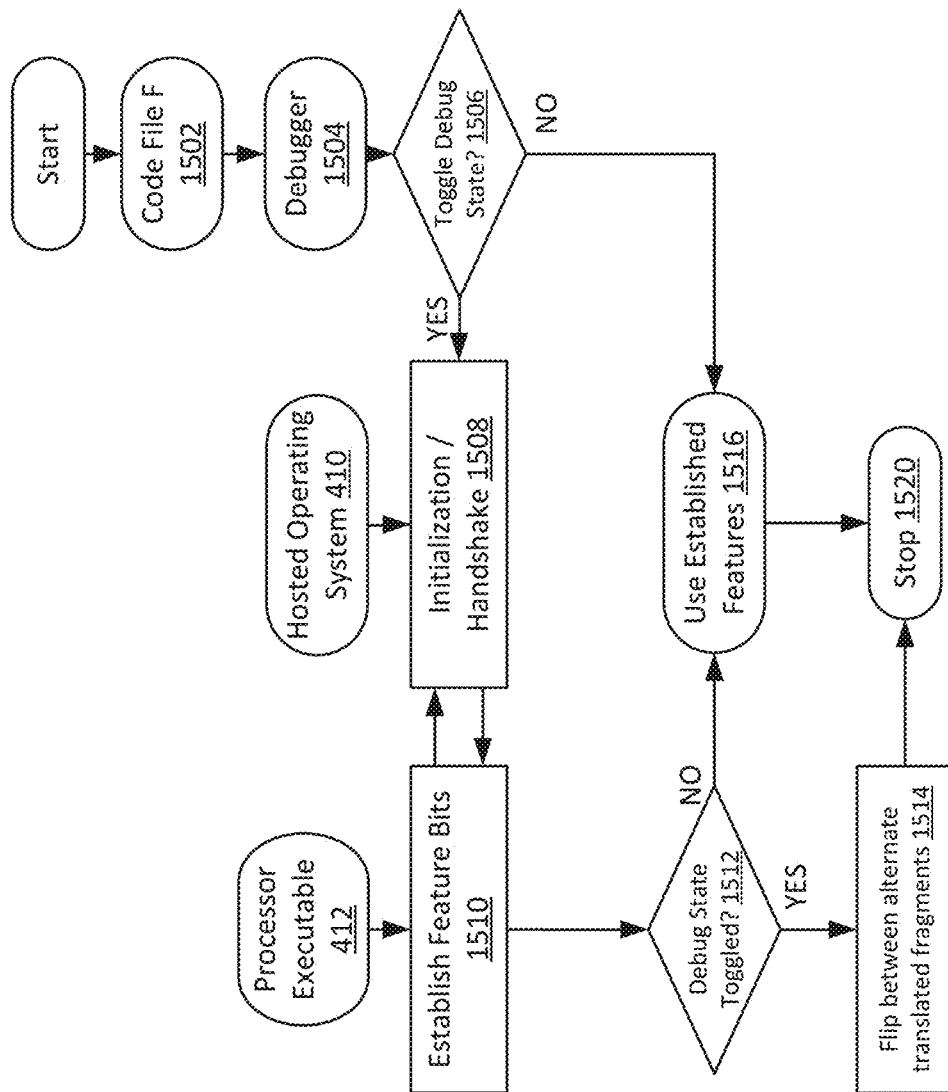
FIG. 15 is a flowchart of an example method of translating code that includes parallel code fragments implementing a debugging state, in accordance with example embodiments.

FIG. 15 is a flowchart of an example method 1500 of translating code that includes parallel code fragments implementing a debugging state, in accordance with example embodiments. Use of parallel code fragments to implement the debugging state represents one possible application of the parallel code fragments concept described herein. Other selectably included features could be added by way of parallel code fragments as well.

In the example shown, the method includes receipt of an executable code file (operation 1502) that includes parallel code fragments which implement debugging features. The code file is provided to a debugger 1504, which can be used to toggle on a debug state. A determination (at operation 1506) is performed to determine whether the debug state is toggled on or off. A handshake operation 1508 is performed between a hosted operating system 410 and processor executable 412 to establish feature bits (at operation 1510).

Following the establishment of Feature Bits (at operation 1510), as long as the debug state remains unchanged the established features (at operation 1516) are used to determine which parallel code fragment selections and/or substitutions are exercised during translation to native code. Whenever it is determined that the Debug State has been toggled following a prior establishment of Feature Bits (at operation 1510, which may be triggered by a request from the Hosted Operating System (410) or the Debugger (1504), leading to a change in state of the established Feature Bits, the selected translated fragments are exchanged from being active to being cached and vice versa (operation 1514). Upon completion of translation, the exchange is completed (at operation 1520) and execution may continue using the newly-selected executable code.

By way of example, the below code segment illustrates an example fragment that may be used in conjunction with the process described in FIG. 15. In particular, in the below, a parallel code fragment is implemented where, if a feature bit is incorporated, the DEBUGCODE section is added to the translated executable to provide interaction with a debugger:
START:
Bypass Fork for DEBUGCODE
Metadata for Debug Code Selection
NONDEBUGCODE:
    <NULL>
DEBUGCODE:
    Debugger Code
MERGE:
    <Program Code>

If the feature bit is enabled, then the debugger breakpoint will not be included in the translated executable. In this way, at the time of translation (i.e., post-compilation, and selectable on the system that will execute the workload including the code fragment) a user may select to incorporate or exclude debugging breakpoints. Therefore, a user may always have debugging breakpoints present in the executable code, but otherwise will not have any performance degradation when debugging features are not enabled, since the translated code will lack such debugging features.

Referring to FIG. 13-15 generally, although this arrangement or use of parallel code fragments is directed to introduction of debugging features, it is noted that other types of features may be used as well. For example, the parallel code fragments may be used to selectively introduce any of a logging code fragment, a diagnostic code fragment, or an execution profiling code fragment. Other types of features may be selectively introduced as well at the time of translation by changing capabilities of the processor executable and hosted environment, with such changes of capabilities triggering retranslation of the executable code into machine-readable code for direct execution. As such, the same executable code may be retranslated "on the fly" when used with, e.g., a just-in-time translator system, such that capabilities are changed upon initiating execution of that executable code using the updated processor executable/hosted environment.

Referring to FIGS. 1-15 generally, it is noted that the parallel code fragment compilation and translation prior to execution provides significant advantages in a number of contexts, such as (1) maintaining consistent performance across different versions of host environments, (2) simplifying executable code distribution by reducing the number of versions that are required to be distributed, and (3) allowing features to be selectably included, such as debugging, logging, or audit features described above, optionally including such features "on the fly" when translation occurs prior to or in conjunction with execution. This allows a processor to dynamically change its capabilities by retranslating a code stream containing parallel code fragments, without a performance penalty at execution time since the translated code only includes the code from the selected fragment. Other advantages are available as well, as reflected herein.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A computing system comprising:
   a computing device comprising:
      a processor, and
      a memory communicatively coupled to the processor and storing instructions which, when executed by the processor, cause the computing device to perform:
         compiling executable code from source code, the executable code including at least one parallel code fragment set including a plurality of parallel code fragments, each of the plurality of parallel code fragments representing a common functional grouping of alternative executable paths through a code stream;
      wherein each of the plurality of code fragments is associated with a different code level and execution of the executable code includes selection of one of the plurality of parallel code fragments from the at least one parallel code fragment set based on a code level supported by a processor executable and a hosted operating system of a hosted computing environment at which the executable code is executed.

2. The computing system of claim 1, further comprising a host computing device configured to perform:
   determining a code level supported by a processor executable and a hosted computing environment at the host computing system, the processor executable supporting the hosted computing environment;
   translating the executable code into machine-readable code executable by a processor of the host computing system, wherein translating the executable code includes selecting a code fragment from among the plurality of parallel code fragments for execution based on the code level supported by the processor executable and a hosted operating system of the hosted computing environment; and
   executing the machine-readable code within the hosted computing environment.

3. The computing system of claim 2, wherein the host computing device is separate from and communicatively connected to the computing device, and the host computing device is configured to receive the executable code from the computing device.

4. The computing system of claim 3, wherein, upon modification of at least one capability of the processor executable, the host computing device is configured to perform:
   determining a second code level supported by the processor executable having the at least one modified capability and the hosted computing environment at the host computing system;
   retranslating the executable code into second machine-readable code executable by the processor of the host computing system, wherein translating the executable code includes selecting a second code fragment from among the plurality of parallel code fragments; and
   executing the second machine-readable code within the hosted computing environment.

5. The computing system of claim 4, wherein the host computing device is configured to perform retranslating the executable code in parallel with execution of the machine-readable code.

6. The computing system of claim 4, wherein the executable code comprises a hosted operating system executable within the hosted computing environment.

7. The computing system of claim 1, wherein the plurality of parallel code fragments includes a set of parallel code fragments including a debug code fragment and a null fragment.

8. The computing system of claim 7, wherein the executable code is executable on a host computing system by selecting one of the plurality of parallel code fragments for translation prior to execution.

9. The computing system of claim 7, wherein the plurality of parallel code fragments includes a second set of parallel code fragments including at least one of a logging code fragment, a diagnostic code fragment, or an execution profiling code fragment.

10. A method of generating executable code for execution within a hosted execution environment, the method comprising:
    compiling executable code from source code, the executable code including at least one parallel code fragment set including a plurality of parallel code fragments, each of the plurality of parallel code fragments representing a common functional grouping of alternative executable paths through a code stream;
    wherein each of the plurality of code fragments is associated with a different code level and execution of the executable code includes selection of one of the plurality of parallel code fragments from the at least one parallel code fragment set based on a code level supported by a processor executable and a hosted operating system of a hosted computing environment at which the executable code is executed.

11. The method of claim 10, wherein compiling the executable code includes:
    establishing a neutral code level executable via any processor executable;
    emitting the at least one parallel code fragment set including at least a plurality of optimized code paths useable dependent upon the code level supported by the processor executable and the hosted operating system;
    emitting executable code according to the neutral code level; and
    marking a merge point code location at which the at least parallel code fragment set is introduced.

12. The method of claim 11, further comprising:
    marking code locations within the source code at which a parallel code fragment from a substitution list may be introduced;
    emitting one or more substitution locations within the executable code; and
    emitting code substitutes for inclusion in the executable code at the end of the executable code.

13. The method of claim 10, further comprising:
    determining a code level supported by a processor executable and a hosted computing environment at a host computing system, the processor executable supporting the hosted computing environment;
    translating the executable code into machine-readable code executable by a processor of the host computing system, wherein translating the executable code includes selecting a code fragment from among the plurality of parallel code fragments for execution based on the code level supported by the processor executable and a hosted operating system of the hosted computing environment; and
    executing the machine-readable code within the hosted computing environment.

14. A computing system comprising:
a host computing device comprising:
- a processor; and
- a memory communicatively coupled to the processor and storing instructions which, when executed by the processor, cause the computing system to perform:
    - storing executable code including at least one parallel code fragment set including a plurality of parallel code fragments, each of the plurality of parallel code fragments representing a common functional grouping of alternative executable paths through a code stream;
    - determining a code level supported by a processor executable and a hosted computing environment at the host computing device, the processor executable supporting the hosted computing environment;
    - translating the executable code into machine-readable code executable by the processor, wherein translating the executable code includes selecting a code fragment from among the plurality of parallel code fragments for execution based on the code level supported by the processor executable and a hosted operating system of the hosted computing environment; and
    - executing the machine-readable code within the hosted computing environment.

15. The computing system of claim 14, further comprising a compiling computing system communicatively connected to the host computing device, the compiling computing system being configured to compile the executable code from source code.

16. The computing system of claim 14, wherein translating the executable code into machine-readable code includes:
- determining whether the processor executable and hosted computing environment support parallel code fragments;
- translating neutral code into at least a portion of the machine-readable code;
- identifying the at least one parallel code fragment set; and
- based on the code level, translating the executable code into the machine-readable code by combining the portion of the machine-readable code with a translated version of a selected one of the plurality of parallel code fragments included in the common functional grouping.

17. The computing system of claim 16, further comprising determining if an unprocessed list of parallel code fragments exists and, processing the unprocessed list to substitute selected code into the machine-readable code based on the code level supported by the processor executable and the hosted operating system.

18. The computing system of claim 14, wherein the plurality of parallel code fragments includes a set of parallel code fragments including a debug code fragment and a null fragment.

19. The computing system of claim 14, wherein the plurality of parallel code fragments includes a second set of parallel code fragments including at least one of a logging code fragment, a diagnostic code fragment, or an execution profiling code fragment.

20. The computing system of claim 14, wherein, upon modification of at least one capability of the processor executable, the host computing device is configured to perform:
- determining a second code level supported by the processor executable having the at least one modified capability and the hosted computing environment at the host computing system;
- retranslating the executable code into second machine-readable code executable by the processor of the host computing system, wherein translating the executable code includes selecting a second code fragment from among the plurality of parallel code fragments; and
- executing the second machine-readable code within the hosted computing environment.

21. The computing system of claim 20, wherein the host computing device is configured to perform retranslating the executable code in parallel with execution of the machine-readable code.

* * * * *